United States Patent
Farrar et al.

(10) Patent No.: US 6,647,376 B1
(45) Date of Patent: Nov. 11, 2003

(54) SYSTEM AND METHOD FOR POINT-OF-SALE CHECK AUTHORIZATION

(76) Inventors: Henry C. Farrar, 39 Bayway Ave., W. Bayshore, NY (US) 11706; John H. Hicks, 61 Shadylawn Dr., Madison, NJ (US) 07940

( * ) Notice: Subject to any disclaimer, the term of this patent is extended or adjusted under 35 U.S.C. 154(b) by 319 days.

(21) Appl. No.: 09/637,357

(22) Filed: Aug. 15, 2000

Related U.S. Application Data

(63) Continuation-in-part of application No. 09/414,549, filed on Oct. 8, 1999, now abandoned.
(60) Provisional application No. 60/103,610, filed on Oct. 9, 1998.

(51) Int. Cl.[7] .............................................. G06F 17/60
(52) U.S. Cl. ............................ 705/45; 705/39; 705/44
(58) Field of Search ............................. 705/39, 44, 45; 235/379

(56) References Cited

U.S. PATENT DOCUMENTS

| | | | |
|---|---|---|---|
| 3,852,571 A | 12/1974 | Hall et al. | 235/61.7 |
| 4,321,672 A | 3/1982 | Braun et al. | 364/408 |
| 4,617,457 A | 10/1986 | Granzow et al. | 235/379 |
| 4,672,377 A | 6/1987 | Murphy et al. | 340/825.34 |
| 4,673,802 A | 6/1987 | Ohmae et al. | 235/379 |
| 4,810,866 A | 3/1989 | Lord, Jr. | 235/379 |
| 4,823,264 A | 4/1989 | Deming | 364/408 |
| 5,053,607 A | 10/1991 | Carlson et al. | 235/379 |
| 5,175,682 A | 12/1992 | Higashiyama et al. | 364/408 |
| 5,231,569 A | 7/1993 | Myatt et al. | 364/408 |
| 5,237,620 A | 8/1993 | Deaton et al. | 382/7 |
| 5,256,863 A | 10/1993 | Ferguson et al. | 235/383 |
| 5,426,281 A | 6/1995 | Abecassis | 235/379 |
| 5,465,206 A | 11/1995 | Hilt et al. | 364/406 |
| 5,484,988 A | 1/1996 | Hills et al. | 235/379 |
| 5,523,167 A | 6/1996 | Hunt et al. | 428/484 |
| 5,594,226 A | 1/1997 | Steger | 235/379 |
| 5,703,344 A | 12/1997 | Bezy et al. | 235/379 |
| 5,925,865 A | 7/1999 | Steger | 235/379 |
| 6,006,208 A | 12/1999 | Forst et al. | 705/39 |
| 6,036,344 A | 3/2000 | Goldenberg | 364/408 |
| 6,189,785 B1 | 2/2001 | Lowery | 235/379 |
| 6,243,689 B1 | 6/2001 | Norton | 705/18 |
| 6,282,523 B1 | 8/2001 | Tedesco et al. | 705/45 |
| 6,283,366 B1 | 9/2001 | Hills et al. | 235/379 |

FOREIGN PATENT DOCUMENTS

EP  0029733 A2 * 11/1980 ........... G06F/15/30

OTHER PUBLICATIONS

US 5,175,683, 12/1992, Higashiyama et al. (withdrawn)*
Marlin, Steven, Target: Point of Sale, Banking Systems and Technology, vol. 35, No. 1, Jan. 1998, pp. 36–42.

* cited by examiner

*Primary Examiner*—Vincent Millin
*Assistant Examiner*—Charles R. Kyle
(74) *Attorney, Agent, or Firm*—Fitzpatrick, Cella, Harper & Scinto

(57) ABSTRACT

A point-of-sale check authorization method inputs transaction and financial institution information from a check to be authorized. This information is communicated to a merchant processor operable to make a check authorization determination. The merchant processor discriminating whether or not the financial institution upon which the check was written is a participating financial institution. If not, the check authorization determination is based upon experiential databases accessible by the merchant processor. If it is discriminated that the financial institution information is a participating financial institution, the merchant processor transmits an information request to the financial institution upon which the check was written, and the financial institution, if sufficient funds are available and other predetermined criteria are met, debits the account in the amount of the transaction.

17 Claims, 15 Drawing Sheets

SYSTEM AND METHOD FOR POINT-OF-SALE CHECK AUTHORIZATION

CROSS-REFERENCE TO RELATED APPLICATIONS

This application is a continuation-in-part of, and claims benefit to, U.S. application Ser. No. 09/414,549, filed Oct. 8, 1999 now abandoned, which claimed benefit to U.S. Provisional Application No. 60/103,610, filed Oct. 9, 1998, both of which are hereby incorporated by reference.

BACKGROUND OF THE INVENTION

1. Field of the Invention

The present invention relates to a system and method for Point-Of-Sale (POS) check authorization. In addition, this system and method provides a merchant, who accepts a check as payment for goods and services, up-to-date customer demand deposit account (DDA) information to assist him in making the decision whether or not to accept the check.

2. Description of the Related Art

Checks have maintained a relatively constant volume for completing point of sale transactions. However, competing forms of payment, such as credit cards and debit (ATM) cards have siphoned off some of the most credit-worthy customers. Because of this development, the check writing population includes a higher percentage of less credit-worthy customers, making checks increasingly risky for merchants to accept. Consequently, check nonpayment, namely, when a legitimate check is drawn on an account that does not contain sufficient funds, has become more common. Losses related to nonpayment are projected to reach $95 Billion by the year 2005. Also of concern is check fraud, that is, when a check is altered, counterfeited, forged, or drawn on a closed account. Losses to financial institutions relating to check fraud have been estimated to be as high as $1.34 Billion. Merchants, rather than financial institutions, absorb the majority, well over 90%, of such losses.

Systems currently exist that provide some security for merchants wishing to accept checks as payment. For example, service providers such as Equifax, Telecheck and NPC maintain databases of customer and account information and offer check authorization services. Two general types of services are offered. These are check verification and check guarantee.

With a check verification service, when a merchant receives a check, he passes it through a check reader that transmits identifying information to the company providing verification services. The company uses a variety of tools to evaluate the risk of accepting the check and then transmits an accept or deny decision back to the merchant at the point of sale. The merchant still must make the decision whether or not he will accept the check. If a check is subsequently returned, the merchant can either try to collect it himself, or engage the collection arm of the verification company, generally for an additional fee. Such verification companies generally charge between $0.02 and $0.20 per check, or a flat monthly fee, for verification services. Verification is typically used by merchants with a high volume of low valued checks, such as grocery stores.

With a check guarantee service, as with check verification, the merchant passes the consumer's check through a reader that transmits identifying information to the guarantee firm. Again, the firm evaluates the risk of the check and then transmits an accept or deny decision back to the merchant at the point of sale. However, with check guarantee, if an approved check is subsequently returned, the guarantee firm must reimburse the merchant for the full amount of the check. The guarantee firm would then take over responsibility for collection. The fee for guarantee services is typically 0.4% to 5% of the check's value. Guarantee services are usually used by merchants who receive a low volume of high value checks, such as jewelry stores.

Merchants authorize checks using magnetic ink character recognition (MICR) reading devices linked to POS systems. Authorization is made over communication networks by the service provider vetting check information against experiential data bases. FIG. 12 shows the steps necessary to complete an authorized check transaction using prior art check authorization techniques.

As shown there, the transaction is initiated by a tender of the check at the point of sale. The authorization request consists of capturing the data on the check and sending the transaction request to the service provider, or acquirer. In making the authorization decision, the service provider vets the check information using resident databases and approves or declines the check. The decision is transmitted to the merchant. Thereafter, the transaction is completed after the merchant allows the purchase if the check is approved. Settlement is achieved by the merchant delivering the check to his bank. His bank processes the check in the normal manner, eventually presenting the check to the payor bank for payment. If the check is not good, and a check guarantee service was used by the merchant, the merchant delivers the dishonored check to the service provider.

Check authorization service providers make use of a multiplicity of information sources in making the authorization decision. Positive file databases are proprietary experiential databases that keep records of accounts that have passed good checks in the past. The databases are built through the experience gained by authorizers as they verify or guarantee the checks of their client base. As a result, the greater the volume of checks processed, the stronger the experiential database is likely to be.

Negative file databases are proprietary experiential databases of known "bad check" offenders. Like the positive file databases, negative files are built through the experience gained by authorizers as they verify or guarantee the checks of their client base. Again, the greater the volume of checks processed, the stronger the experiential database is likely to be.

DDA status information is used to a limited extent by some check authorization service providers. This information is stored in databases external to the service providers and is maintained and updated by participating financial institutions. The positive files indicate which accounts may present problems by tagging them with cautionary codes, such as closed, closed-for-cause, NSF (non-sufficient funds), new account, and the like. However, the current services offered by providers possess limited DDA population coverage and incomplete information. Since only banks can access DDA information in real-time, the DDA information in the possession of authorization providers may not be up to date.

Check authorization service providers also use risk management systems and proprietary risk assessment tools developed internally by such firms. These are used to assess the risk of a given transaction based upon numerous variables including the results returned by negative file, positive file, and DDA status databases.

Systems have been proposed that eliminate the need for checks altogether. For example, U.S. Pat. No. 4,673,802 (Ohmae et al.) describes a central processing system having stored data relating to accounts of users. The purchase is approved or disapproved on the basis of the information stored on the computer, and the account is debited taking into account a period of indulgence from the date of the transaction.

U.S. Pat. No. 5,484,988 (Hills et al.) is directed to a point-of-sale system that reads customer information, for example from the customer's check, credit card or through manual input, and subsequently, by means of an automated clearing house (ACH) network transaction, debits the customer's account for the amount of the goods and services provided and credits the merchant's account for the same amount. The system includes hardware to read customer information to verify that the customer has an appropriate balance to conduct the transaction from a central computer system holding information relating to various customers' credit-worthiness. The transaction information is stored at the central computer for subsequent reconciliation via the ACH network, if the transaction is approved.

The systems discussed above have several drawbacks. First, those that rely on information stored in central databases by their very nature do not provide access to up-to-the-minute status regarding the customer's account. A merchant who relies on such a system runs the risk that the customer, while generally credit-worthy, currently has insufficient funds in his account.

Moreover, many consumers prefer to use paper checks because they have become accustomed to using the returned checks for balancing their checkbooks and maintaining their household budgets. Thus, paperless systems, such as those proposed in the Hills and Ohmae patents, are perceived to be less that desirable, at least by some.

Further, the ACH network of the system disclosed in the Hills patent is a batch driven system and does not provide real-time access to the account of the customer or to current information regarding the account. Because of the delay involved in batch driven systems, there is no guarantee that the customer's account will have sufficient funds by the time the ACH transaction debiting the funds has been processed.

Thus, the need exists to provide a system that allows merchants to continue to accept customers' paper checks with the assurance that the check is drawn on a currently valid account then having sufficient funds to cover the transaction.

SUMMARY OF THE INVENTION

In consideration of the above drawbacks of the prior art, it is an object of the present invention to provide a system and method permitting a merchant at the point of sale to enter information relating to a customer's check and transaction information into a point-of-sale terminal. In such a method and system, the entered information is transmitted to a merchant processor, which then initiates transmittal of an inquiry communication to the customer's (payor) bank, preferably through an electronic funds transfer (EFT) switch. Optionally, some merchants may connect directly to banks and some merchant processors may connect directly to banks where there is a significant market presence of a few banks. Upon receipt of the inquiry communication, the bank accesses the demand deposit account (DDA) of the customer to determine if the DDA contains sufficient funds to cover the transaction, and if it does, and if other predetermined criteria are met, the bank debits the customer's DDA in the amount of the transaction. The bank then transmits DDA information, including whether or not the DDA was debited, to the merchant processor, preferably by means of the EFT switch. The merchant processor can then make the authorization decision based upon the response of the bank and report the decision to the merchant.

In accordance with one aspect of the present invention, there is provided a point-of-sale check transaction authorization method, comprising: inputting into a point-of-sale terminal transaction information, including a transaction amount, and financial institution information from a check to be authorized; communicating the input transaction information and financial institution information to a merchant processor having logic means for making a check authorization determination; discriminating, from the financial institution information, whether or not the financial institution upon which the check was written is a participating financial institution; if it is discriminated that the financial institution is not a participating financial institution, making a check transaction authorization determination based upon experiential databases accessible by the merchant processor; if it is discriminated that the financial institution is a participating financial institution, performing the following steps: transmitting, by the merchant processor, an information request based upon the input transaction information and financial institution information to the financial institution upon which the check was written; verifying, by the financial institution upon which the check was written, whether an account associated with the financial institution information contains sufficient funds to cover the transaction, if sufficient funds are present and if other predetermined criteria are met, debiting the account associated with the financial institution in the amount of the transaction, and transmitting information relating to the whether the account has been debited to the merchant processor; if the financial institution has debited the account, the merchant processor communicating a transaction authorization to the merchant, and the merchant voiding the check and returning the check to the customer; and if the financial institution has not debited the account, the merchant processor making a transaction authorization determination based upon information other than the account information transmitted from the financial institution.

In accordance with another aspect of the present invention, there is provided a point-of-sale check transaction authorization system for authorizing a check that is presented to a merchant at the point of sale in payment for goods or services, the system comprising: an input unit operable to input information comprising: data from the check, including information as to a financial institution upon which the check was written, and transaction information, including an amount of the transaction; and a merchant processor operable to make an authorization decision. The merchant processor has: a communication unit operable to communicate with the financial institution; means for accessing information relating to a writer of the check from an experiential database; and logic means for making the authorization determination on the basis of: the input information and information from the accessed experiential database, in a case that the data from the check is not indicative that the financial institution upon which the check was written is a participating financial institution; or on the basis of the information received in a communication with the financial institution, in a case that the data from check is indicative that the financial institution upon which the check was written is a participating financial institution. The merchant processor is operable, by means of the communication unit, to: transmit to the participating financial institution upon which the check was written an information request based upon the input financial institution data from the check and the input transaction information; and receive account information from the participating financial institution, the account information relating to whether the account has sufficient funds to cover the transaction amount and whether the account has been debited by the participating financial institution, the merchant processor further being operable to: if the financial institution has debited the account: communicate a transaction authorization to the merchant, the merchant voiding the check and returning the check to the customer in response to the communication; and if the financial institution has not debited the account, making a transaction authorization determination based upon information other than the account information transmitted from the financial institution.

In accordance with yet another aspect of the present invention, there is provided a point-of-sale check transaction authorization apparatus for authorizing a check that is presented to a merchant at the point of sale in payment for goods or services, the apparatus comprising: an input unit operable to input information comprising: data from the check, including information as to a financial institution upon which the check was written, and transaction information, including an amount of the transaction; a merchant processor operable to make an authorization decision, said merchant processor including: a communication unit operable to communicate with the financial institution; means for accessing information relating to a writer of the check from an experiential database; and logic means for making the authorization determination on the basis of: (a) the input information and information from the accessed experiential database, in a case that the data from the check is not indicative that the financial institution upon which the check was written is a participating financial institution; or (b) on the basis of the information received in the communication with the participating financial institution, in a case that the data from check is indicative that the financial institution upon which the check was written is a participating financial institution. The merchant processor is operable, by means of the communication unit, to: transmit to the participating financial institution upon which the check was written an information request based upon the input financial institution data from the check and the input transaction information; and receive account information from the participating financial institution, the account information relating to whether the account has-sufficient funds to cover the transaction amount and whether the account has been debited by the participating financial institution, the merchant processor further being operable to: if the financial institution has debited the account: communicate a transaction authorization to the merchant, the merchant voiding the check and returning the check to the customer in response to the communication; and if the financial institution has not debited the account, making a transaction authorization determination based upon information other than the account information transmitted from the financial institution.

DETAILED DESCRIPTION OF THE PREFERRED EMBODIMENTS

Figure 1:
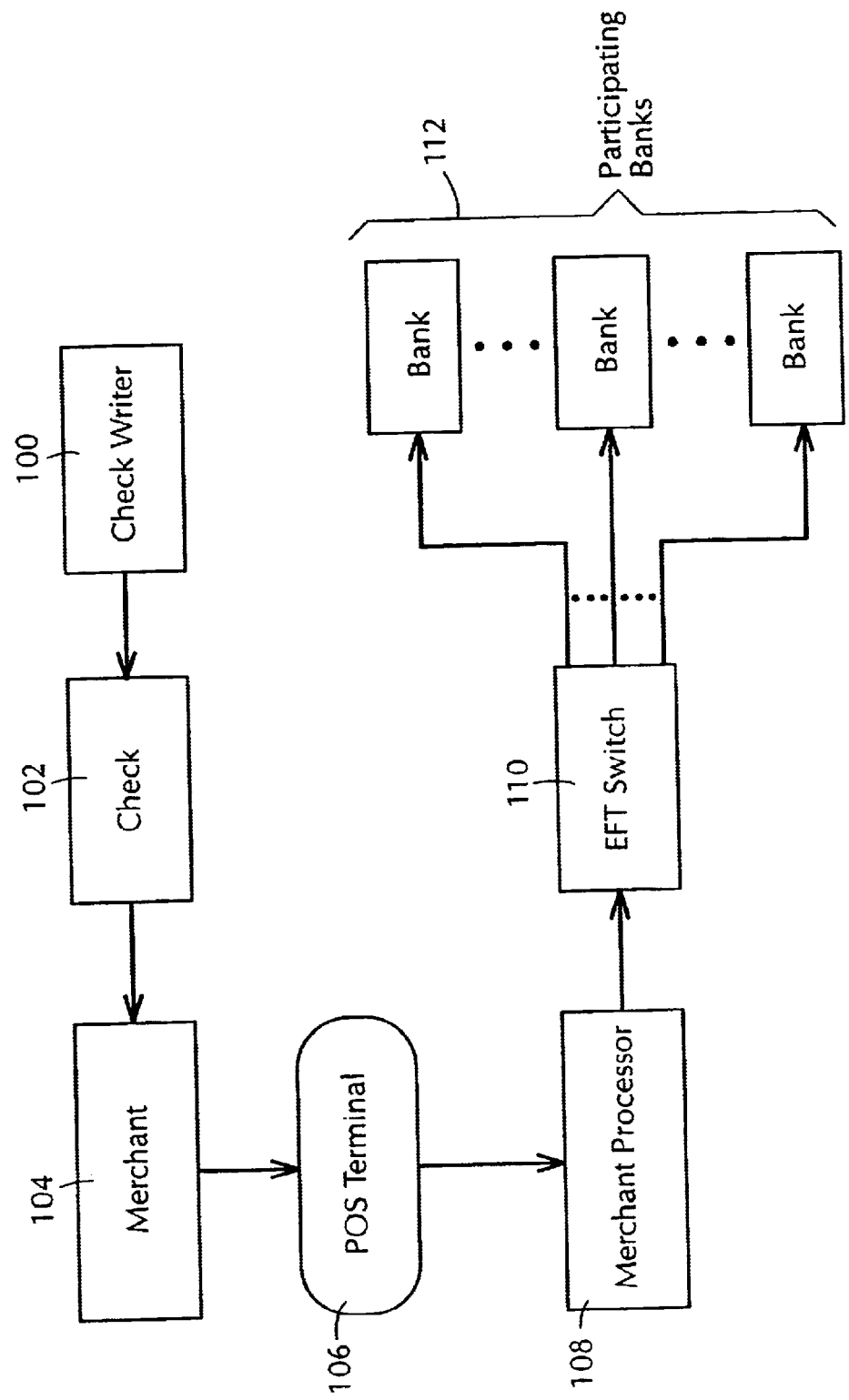
FIG. 1 is a schematic diagram of the overall system of the present invention.

FIG. 1 is a schematic diagram showing an overview of the system of the present invention. Typically, a check writer, who will be referred to as the "customer" hereinafter, 100 presents a check 102 for payment to a merchant 104. The merchant 104 has at his place of business a POS terminal 106, with which he may initiate the check authorization process by entering, or having scanned in, the magnetic ink character recognition (MICR) information from the check and entering the transaction information. The POS terminal may also be structured to include a card reader, to process ATM transactions, for example.

POS terminal 106 is connected electronically to a merchant processor 108, such that information can be transferred from the POS terminal 106 to the merchant processor 108, and vice versa. The merchant processor 108 is connected electronically to electronic funds transfer (EFT) switch 110.

The EFT switch 110 is preferably one of the well-known regional and national EFT switches that provide for switched transactions between the point of sale and demand deposit account (DDA) information in ATM transactions and point of sale debit transactions. Examples of regional EFT switches include NYCE, HONOR, MAC, STAR and PULSE. National EFT switches include INTERLINK, CIRRUS and PLUS.

EFT switch 110 is connected to a bank 112, which in this case is the bank upon which the check is written, that is, the payor bank, and other banks participating in the system of the present invention.

The preferred embodiments are described using example transactions in which the check is drawn on a bank. However, as will be appreciated, the invention is not limited to checks or drafts drawn on entities fitting the legal definition of a bank. The invention has applicability to checks or drafts drawn on other financial institutions that generally perform functions similar to banks, such as credit unions, savings and loans and the like. As will be appreciated, the same or substantially similar steps and interfaces described in the exemplary embodiments below would also be used with such other financial institutions.

The EFT switch 110 is structured to pass along information from the merchant processor 108 to the bank 112 and in the opposite direction, that is, from the bank 112 to merchant processor 108.

Bank 112 maintains demand deposit accounts (DDAS) for its customers, including customer 100, and has a computer system structured to access information regarding the DDAs and to transmit the information to the EFT switch 110, which can then pass the information along to the merchant processor. The bank's computer system also is operable to debit and credit the DDAs of its customers.

Communication between the components shown in FIG. 1 may be by a normal public switched telephone network ("PSTN") or at least between some of the components may be by a dedicated network connection.

Figure 2:
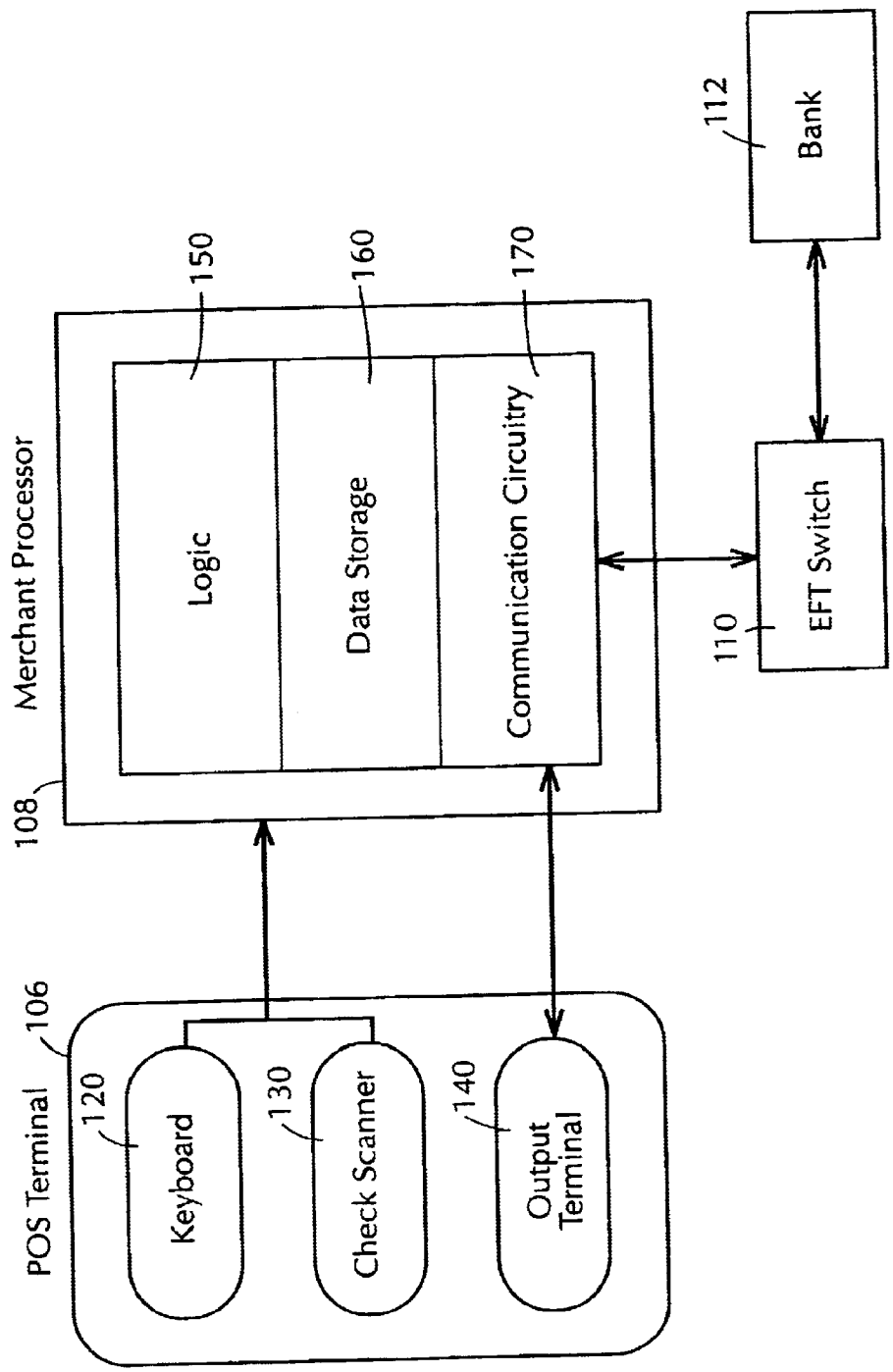
FIG. 2 is a more detailed schematic diagram showing the structure of the POS terminal and the merchant processor in accordance with the present invention.

FIG. 2 is a schematic diagram that illustrates the POS terminal 106 and merchant processor 108 in greater detail. As shown there, POS terminal 106 includes a keyboard 120 for manual input by the merchant of the MICR information from the check, the amount of the transaction, and optionally other information relating to the customer. Check scanner 130 may be provided to scan the MICR information, magnetically, or by other means, so that the keyboard does not have to be used for this purpose. As shown in the figure, the POS terminal 106 is connected to the merchant processor 108 to allow the information entered via the keyboard 120 and check scanner 130 to be transmitted to the merchant processor 108. An output terminal 140 enables the information entered to be displayed as it is being entered, and also allows the authorization information later received from the merchant processor 108 to be viewed by the merchant. Preferably, the POS terminal 106 comprises the known Omni 470, an integrated terminal and high speed thermal printer, together with and CR 600 check reader, each manufactured by Verifone.

As will be appreciated by one skilled in the art, the POS terminal 106 may utilize other conventional data entry devices or output devices, in addition to or in lieu of those described with reference to the preferred embodiment, and the present invention is not limited to the preferred embodiment.

The merchant processor 108 preferably is a service provider of the type that offers traditional check authorization services. In addition to those services, in accordance with the present invention the merchant processor 108 can access bank DDAs through the EFT switch 110. The merchant processor maintains a central database 160 containing information about a large number of customers and accounts. The merchant processor 108 includes logic 150, which consists, for example, of a computer system, or hardwired logic circuitry, or a combination of both, to process the authorization decision and to control communication. Communication circuitry 170 allows the merchant processor 108 to communicate electronically with the POS terminal 106 and with the EFT switch 110.

Although the merchant processor 108 has been described with reference to the preferred embodiment as being located remotely from the point of sale, the present invention is not limited to that embodiment. The merchant processor 108 may instead consist of equipment and software resident at the point of sale, for example in association with a personal computer, allowing the merchant to communicate directly with the EFT switch 110. Further, the present invention is not limited to the disclosed system in which the EFT switch 110 is intermediate between the merchant processor 108 and the bank 112, and may provide for direct communication between the merchant or merchant processor 108 and the bank 112.

Figure 3:
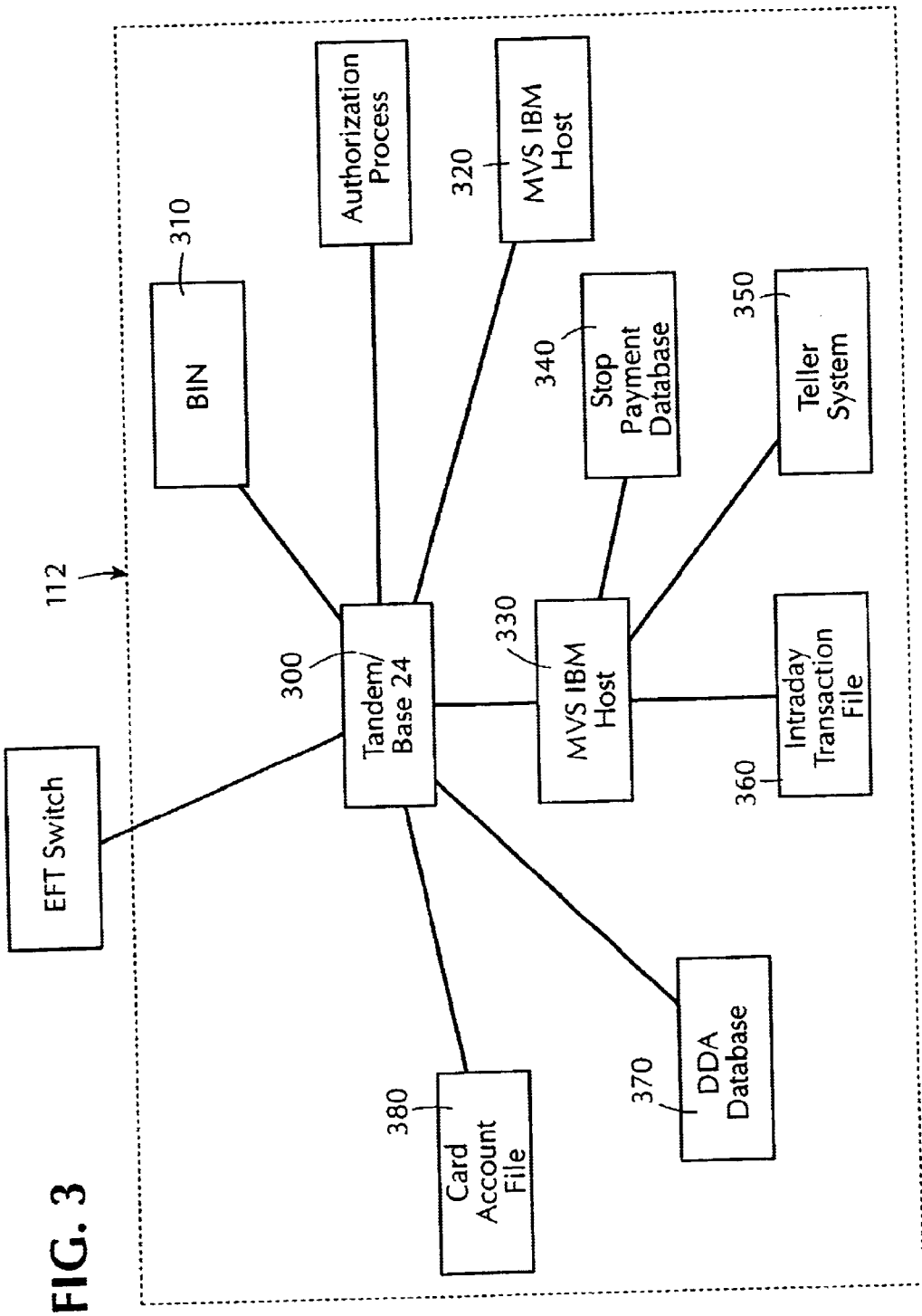
FIG. 3 is a schematic diagram illustrating the computer system resident at a participating bank and the connection between the bank and an electronic funds transfer (EFT) switch.

FIG. 3 is a schematic diagram of the computer system of bank 112 and interconnection of the computer system to the EFT switch 110. Bank 112 includes a front end processor 300. Front end processor 300 connects the Bank 112 to the EFT switch 110. Within the bank, the front end processor 300 is connected to components identified in the figure as BIN 310, MVS IBM Host 320, MVS IBM Host 330, DDA database 370 and card account file (CAF) 380. BIN 310 is a database that includes bank identification numbers, each including a transaction routing number that is unique to bank, and a number unique to each DDA account. The front end processor 300 is operable to associate BIN numbers received from the EFT switch with the corresponding DDA from the information stored in the DDA database 370. MVS IBM 320 and MVS IBM 330 are mainframe computers used to run most of the bank's systems. MVS IBM Host 330 is connected to a stop payment database 340, which is a warehouse of checks upon which stops have been placed, to a teller system 350 and to an intraday transaction file 360, which is a file that is kept of all transactions within a given banking day. That file 360 can be uploaded to various systems, such as the DDA database 370, in a batch updating process.

Figure 4:
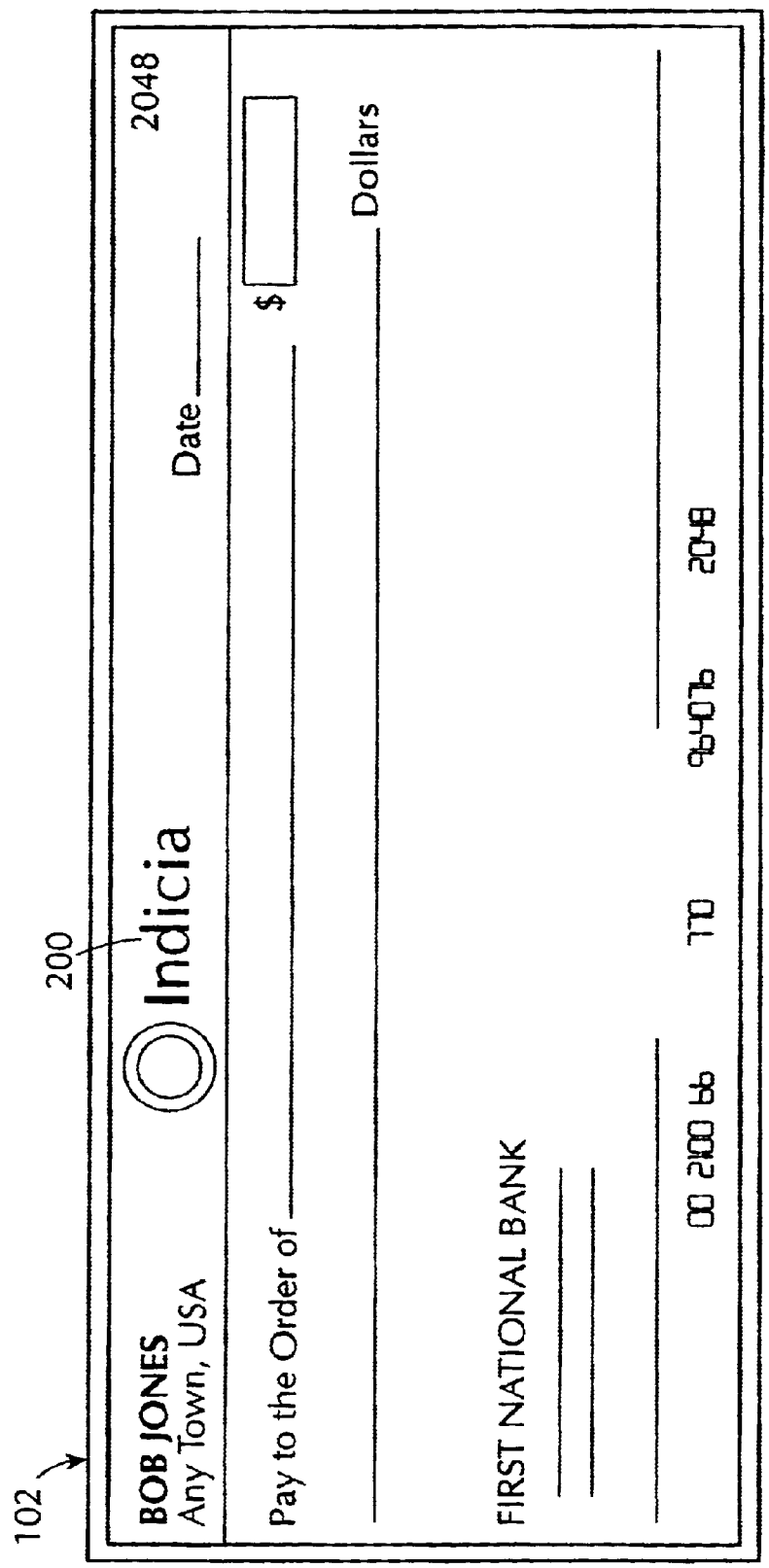
FIG. 4 is a depiction of a check having printed thereon indicia identifying the check as being associated with a bank participating in the system of the present invention.

FIG. 4 shows a check 102 bearing indicia 200 indicating that the bank upon which the check is written is a participant in the system. Such indicia may be a visible on the face of the check so that its presence can be recognized by the merchant 104 and this fact entered into the POS terminal 106. Alternatively, the indicia may be of a type that can be recognized or read by the scanner 130 associated with the POS terminal 106. For example, the indicia may simply be the MICR characters listing the routing/transit number of the bank on which the check is drawn, which information can be compared with a database of participating banks.

In a first embodiment, the POS system of the present invention performs a process that permits the merchant 104 to verify that a check, and in particular the MICR information printed on the check, presented for payment by a customer corresponds to an existing valid DDA. Although such verification will not prevent all fraud, it will prevent merchant acceptance of checks written on closed or false accounts. The steps in such a process are illustrated in the flow chart of FIG. 5.

Figure 5:
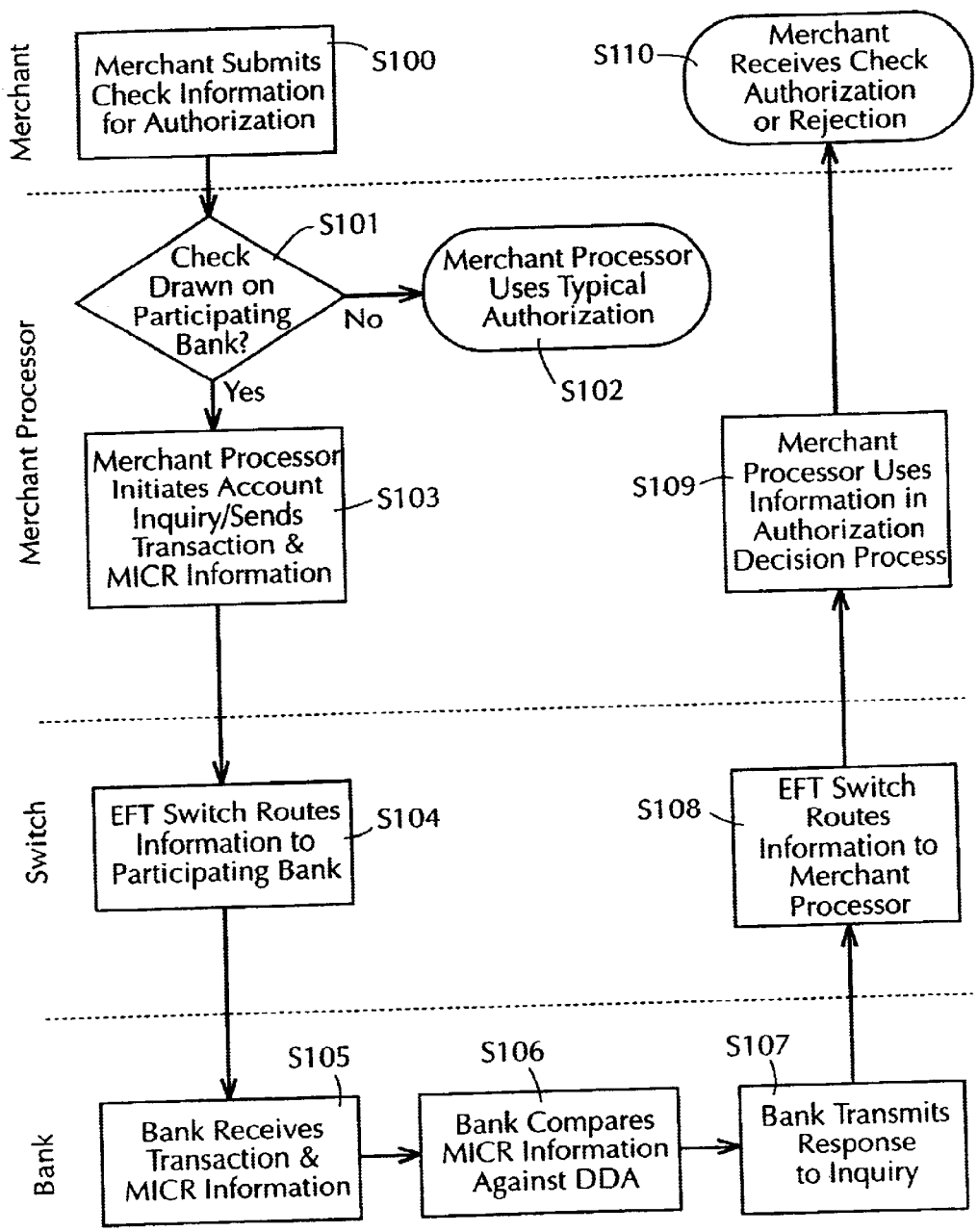
FIG. 5 is a flow chart illustrating an account verification process according to a first embodiment of the present invention.

FIG. 5 shows this process flow as it passes between the merchant 104, the merchant processor 108, the EFT switch 110, and the bank 112 upon which the check was written. At step S100, the merchant 104, having been presented with a check 102 in payment for goods or services by a customer 100, submits the check information for authorization, for example by entering through the keyboard 120, or scanning by means of the scanner 130, the MICR data and other information from the presented check into the POS terminal 106. The information then is transmitted from the POS terminal 106 to the merchant processor 108. Next, at step S101, it is determined if the check bears indicia, whether it be visually recognizable, as shown in reference numeral 200, or scannable, as in MICR encoded routing/transit number indicating that the bank upon which it is written is a participant in the POS authorization system of the present invention. If it does not, the merchant processor 108 uses typical authorization techniques, preferably utilizing its database and authorization criteria, which do not require access to the DDA of the customer 100. If it is determined that the check bears the appropriate indicia, the merchant processor 108, at step S103, initiates an account inquiry by transmitting electronically the transaction amount and MICR information to the EFT switch 110. In step S104, the EFT switch 110 routes the information to the bank 112 on which the check was written, which has been determined to be a bank participating in the POS check verification system of the present invention.

At step S105, the bank 112 receives the transaction and MICR information and, at step S106, compares the MICR information against the DDA to determine if a match exists. The existence of a match indicates that the check is drawn on a currently active account and provides increased security against check fraud. At step S107, the bank 112 transmits electronically a response to the inquiry by means of an intermediate transmission, at step S108, to the EFT switch 110, which thereafter routes the response to the merchant processor 108. At step S109, the merchant processor 108 uses the information supplied by the bank in making the authorization decision, that is, it decides whether the check should be accepted as payment for the goods or services sought to be purchased. At step S110, the merchant receives, via POS terminal 106, or via an ordinary phone call, the check authorization or rejection from the merchant processor 108.

Figure 6:
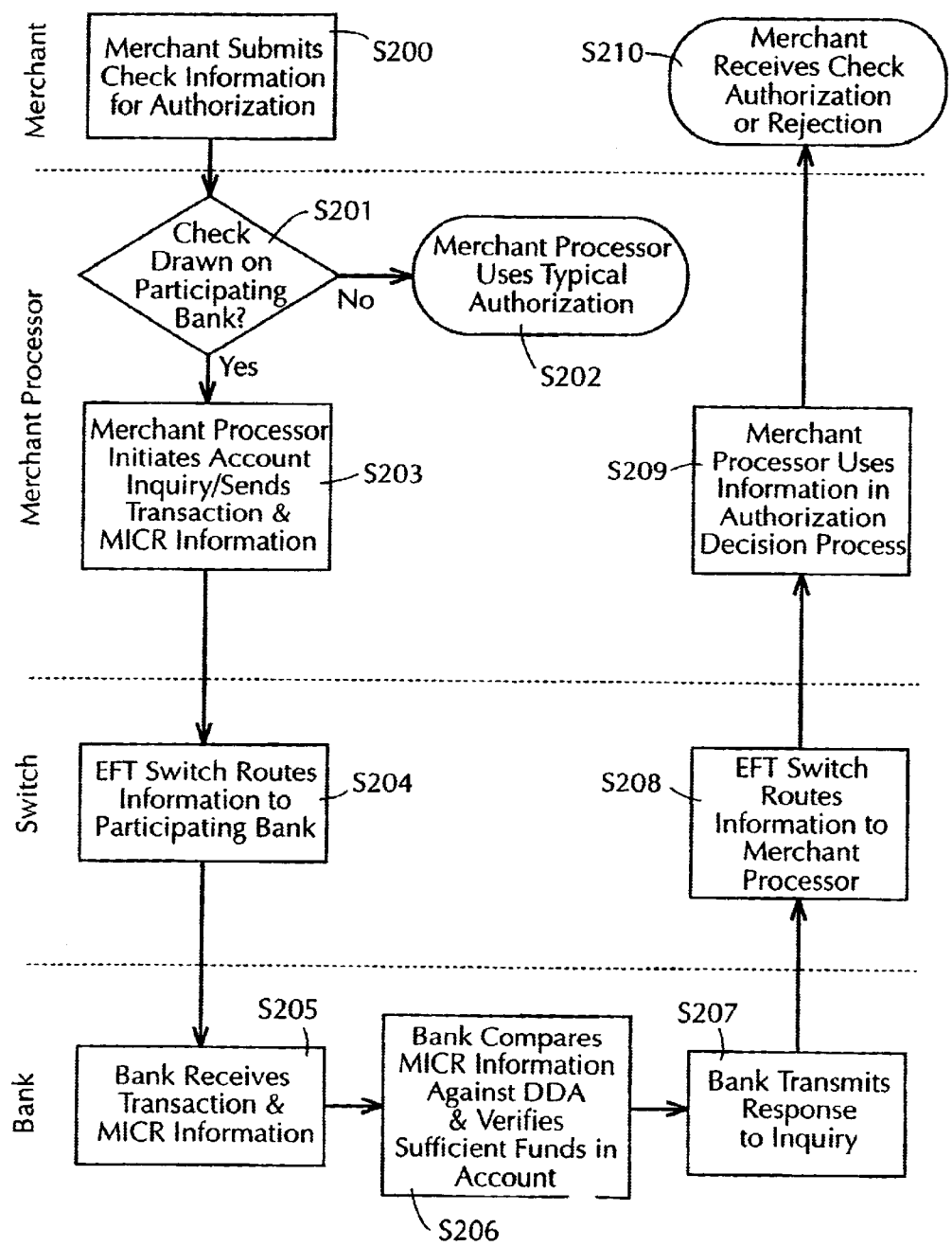
FIG. 6 is a flow chart illustrating a funds verification process according to a second embodiment of the present invention.

In a second embodiment of the POS check verification system of the present invention, a process is performed that allows the merchant to determine if the DDA of the customer currently contains sufficient funds to cover the proposed transaction. In this second embodiment, the process of which is illustrated in FIG. 6, many of the process steps are identical to the corresponding steps shown in FIG. 5. Thus each of steps S200 through S205 and S207 through S210 corresponds to and is the same as steps S100 to S105 and S107 to S110 in FIG. 5 respectively. However, in step S206, the bank 112 additionally performs the step of verifying that sufficient funds are present in the DDA to cover the transaction.

Even if it is verified that sufficient funds are in the account, nonpayment risk is not eliminated, as the customer could potentially make withdrawals prior to clearing of the authorized check by physical means or write numerous checks on the same day. A third embodiment of the present invention advantageously allows a hold to be placed on the DDA of the customer 100 in the amount of the check. This feature protects against an unscrupulous customer going from merchant to merchant writing multiple checks, each in an amount covered by the amount of funds in his account, but which in total exceed the amount in the account. In the third embodiment, those funds held for the merchant's transaction will not be available to cover a transaction at the place of business of another merchant seeking verification, since the amount held will be subtracted from the customer's available balance. The account, however, will not be debited until the physical check associated with this transaction arrives at the payor bank 112. Because the system of the present invention provides real-time access to the DDAs themselves, the hold will take effect almost immediately, reducing the chance of a delay that might allow more than one check to be authorized based on the same funds.

Figure 7:
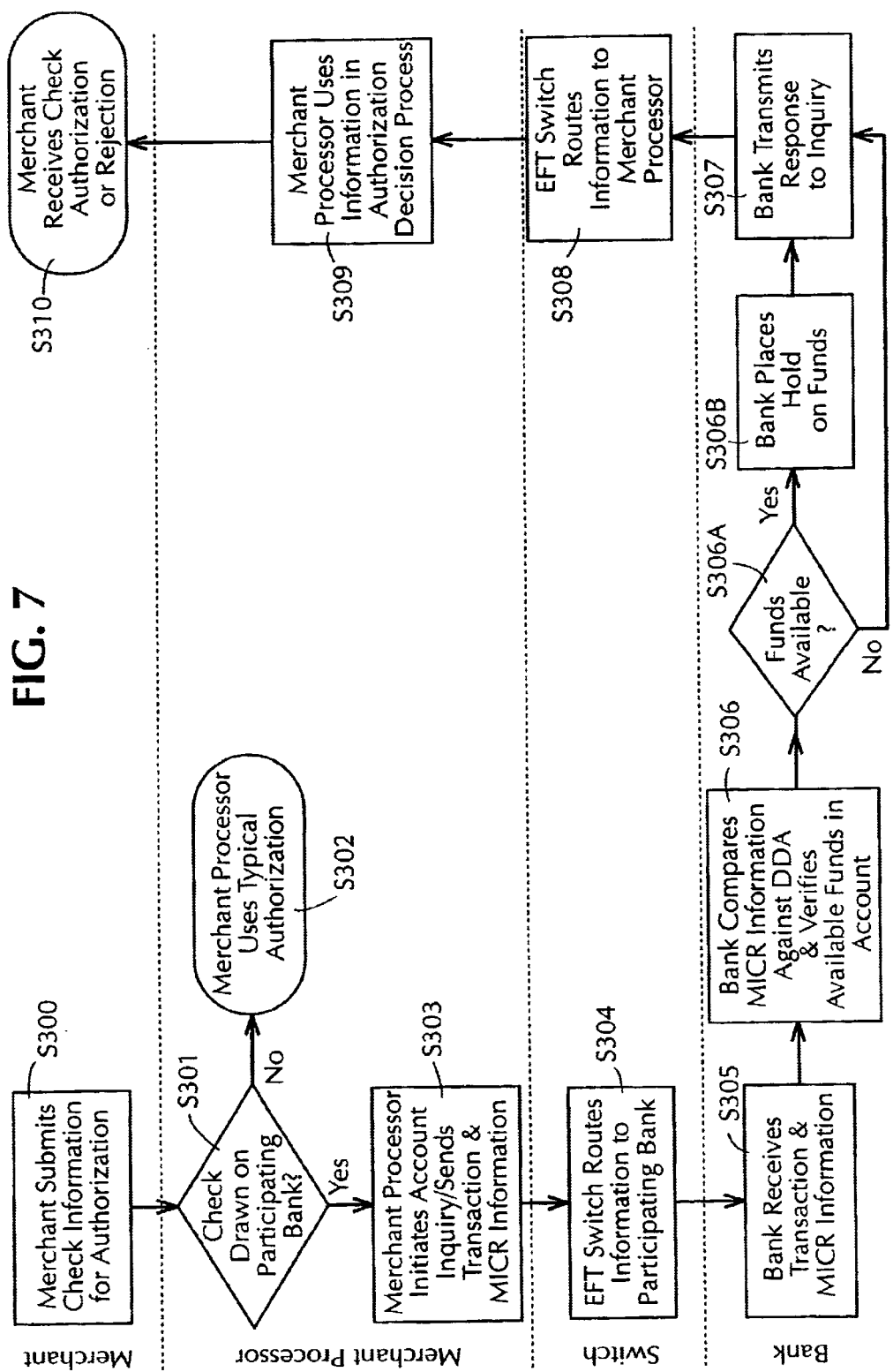
FIG. 7 is a flow chart illustrating a funds hold process according to a third embodiment of the present invention.

FIG. 7 is a flow chart that illustrates the process performed by the system of the present invention in accordance with this third embodiment. At step S300, the merchant 104 submits the check information for verification to the merchant processor 108. At step S301, a determination is made whether the system indicia is present on the check. If not, the merchant processor 108, at step S302, uses typical authorization techniques. If the indicia is present, the merchant processor 108, at step S303, initiates an account inquiry and transmits electronically the transaction and MICR information to the EFT switch 110. At step S304, the EFT switch 110 routes the information to the bank 112 upon which the check was written, which has been determined to be a participating bank.

The bank 112 receives the transaction and MICR information, at step S305, and, at step S306, compares the MICR information against the DDA and verifies that the account has sufficient funds to cover the transaction. If it is determined that funds are; available, the bank 112 places a hold on the funds in the amount of the proposed purchase in step S306B, and transmits a response to the merchant processor 108 via the EFT switch 110, in steps S307 and S308. If,ion the other hand, the account does not have sufficient funds, the bank 112 transmits information to that effect in the response to the inquiry at steps S307 and S308. As in the other embodiments discussed above, the merchant processor 108 uses the information to make an authorization determination (step S309) and the merchant receives the authorization or rejection (step S310). If the customer decides not to complete the purchase, a reversal transaction is generated.

In this embodiment, the bank guarantees the funds to the merchant processor 108, or merchant if the merchant is connected directly to the bank. The physical check is deposited by the merchant with his bank, the bank of first deposit (BOFD), which either forwards the physical check for collection to the payor bank 112 or creates an electronic check presentment (ECP) file and transmits it to the payor bank 112. The check will still be forwarded to the payor bank even if an ECP file has been previously transmitted to the bank 112. When either the check or the ECP file arrives at the payor bank 112 (whichever occurs first), the hold on the funds is reversed and account debited for the amount of the check, which amount will be equal to the amount of the hold. If the check or ECP file containing information about the check do not arrive within a reasonable time, (e.g., three days) the hold is removed and the funds again made available for other transactions.

Figure 8:
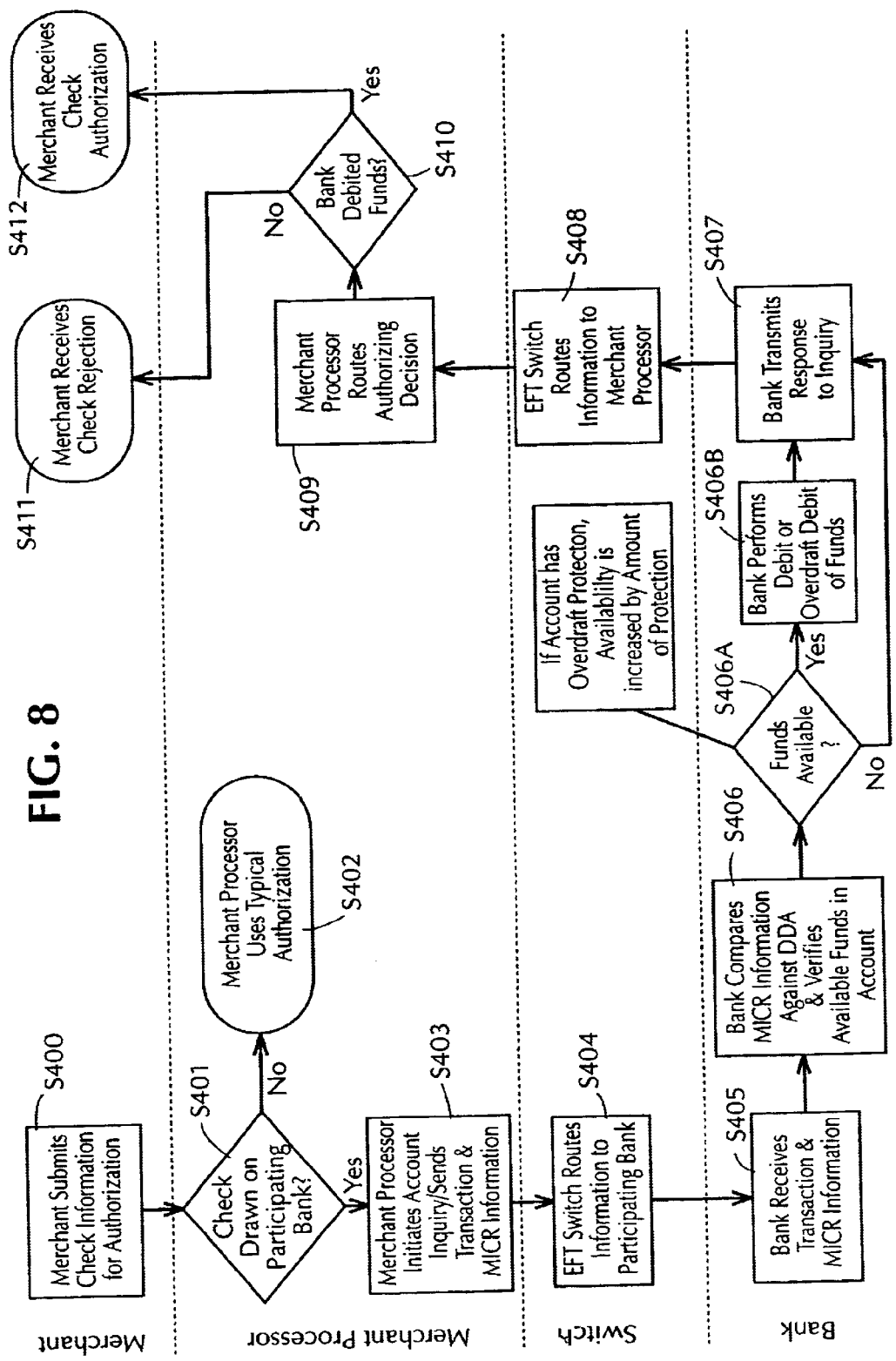
FIG. 8 is a flow chart illustrating a debit funds process according to a fourth embodiment of the present invention.

In a fourth embodiment of the present invention, rather than simply placing a hold on the funds in the DDA, as in the third embodiment, the DDA is debited by the amount of the transaction. As is illustrated in FIG. 8, process steps S400 through S406 in this fourth embodiment are identical to the corresponding steps S300 to S306 shown in FIG. 7 with reference to the third embodiment. However, in the fourth embodiment, at step S406A, if funds are available, the process proceeds to step S406B, in which the bank 112 debits the funds from the account. If the account has overdraft protection, the availability determination is made taking into consideration the amount of protection provided by the overdraft protection. Therefore, at step S406B, the debit may be taken from the overdraft protection, in addition to whatever funds are actually present.

If the funds are not available, even with the overdraft protection, the process bypasses step S406B. In step S407, the bank 112 transmits a response to the inquiry to the EFT switch 110, which then, at step S408, routes the information to the merchant processor 108, which receives the information at step S409. The merchant processor 108 determines from the received information whether or not the funds have been debited from the account. If the funds have not been debited, the process flow proceeds to step S411, and the merchant 104 receives an indication of check rejection. If the funds have been debited, the merchant 104 receives a check authorization, at step S412, and the transaction may proceed. If the customer decides not to complete the transaction, a reversal transaction is generated.

There may be situations when, although funds are not currently available for release from the customer's DDA, a high probability exists that the funds will be present shortly thereafter. In such an event, it may be advantageous to structure the system of the present invention so that the merchant processor 108 has the option of guaranteeing the check even if the attempt to debit the funds from the customer's DDA fails. The process of a fifth embodiment, in which the merchant processor 108 is provided with the option to make such a guarantee, is illustrated in FIG. 9.

Figure 9:
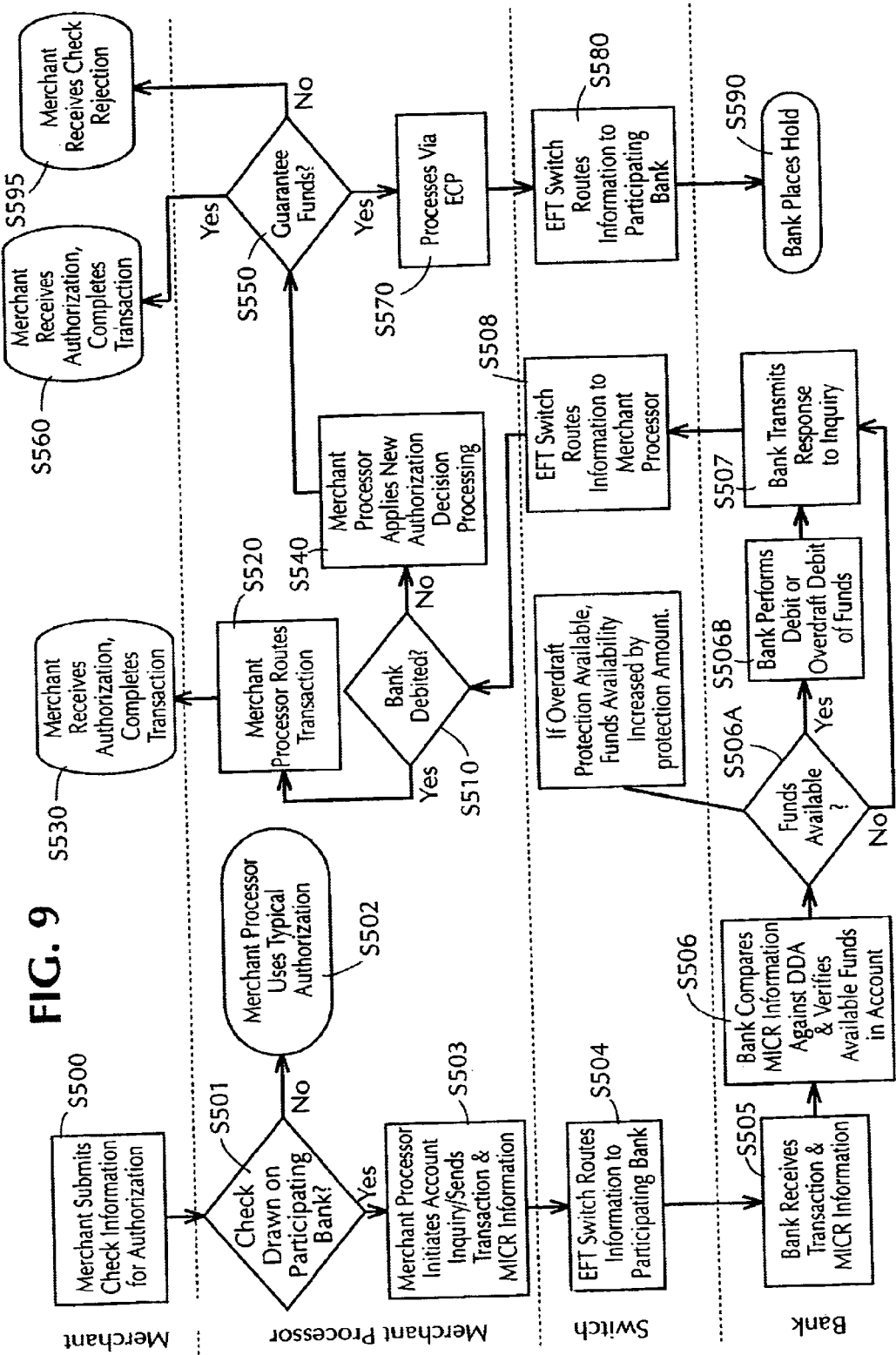
FIG. 9 is a flow chart illustrating a merchant/processor guarantee and bank debit process according to a fifth embodiment of the present invention.

As shown in FIG. 9, in the fifth embodiment, process steps S500 through S508 are identical to the corresponding process steps S400 through S408 shown in FIG. 8 with respect to the fourth embodiment. In the process of the fifth embodiment, at step S510, if the DDA has been debited, the merchant processor 108 routes the transaction to the merchant 104 at step S520 and, at step S530 the merchant 104 receives authorization and completes the transaction. However, the fifth embodiment differs from the fourth embodiment in that, if the DDA was not debited, the process flow continues to step S540, where the merchant processor 108 applies new and different authorization processing, taking into account other information in its possession that may make it worth the risk to guarantee the check. If, at step S550, the merchant processor 108 has made the decision to guarantee the funds, the merchant 104 receives authorization and completes the transaction, at step S560. Also, the merchant processor 108, at step S570 initiates electronic check presentment (ECP) to the bank via the EFT switch 110 in steps S580. In step S590, the bank 112, after having been presented with the check electronically, places a hold on the funds. Alternatively, at S570 the check presentment may be effected by traditional methods by returning the physical check to the payor bank.

If, at step S550, the merchant processor 108 has made the decision not to guarantee the funds, the flow proceeds to step S595 at which point the merchant 104 receives a rejection message.

It may also be advantageous to provide the bank 112 with the option of guaranteeing the check in the event the attempt to debit the funds fails. The bank 112 in fact may be in the best position to determine the risk of making such a guarantee since the customer likely has a history with the bank. In addition, the reason for the failure at the debit step may simply be that funds deposited by the customer to cover the check have not yet cleared. For example, the customer may have deposited his paycheck on a Friday night, and be seeking to purchase goods or services by check on Saturday, on the assumption that the deposited funds will cover the check. The bank 112, having access to this information, may decide to guarantee the check even though the funds technically are not part of the customer's available balance. The process for a sixth embodiment, in which the bank 112 has the option of guaranteeing the check, is illustrated in FIG. 10.

Figure 10:
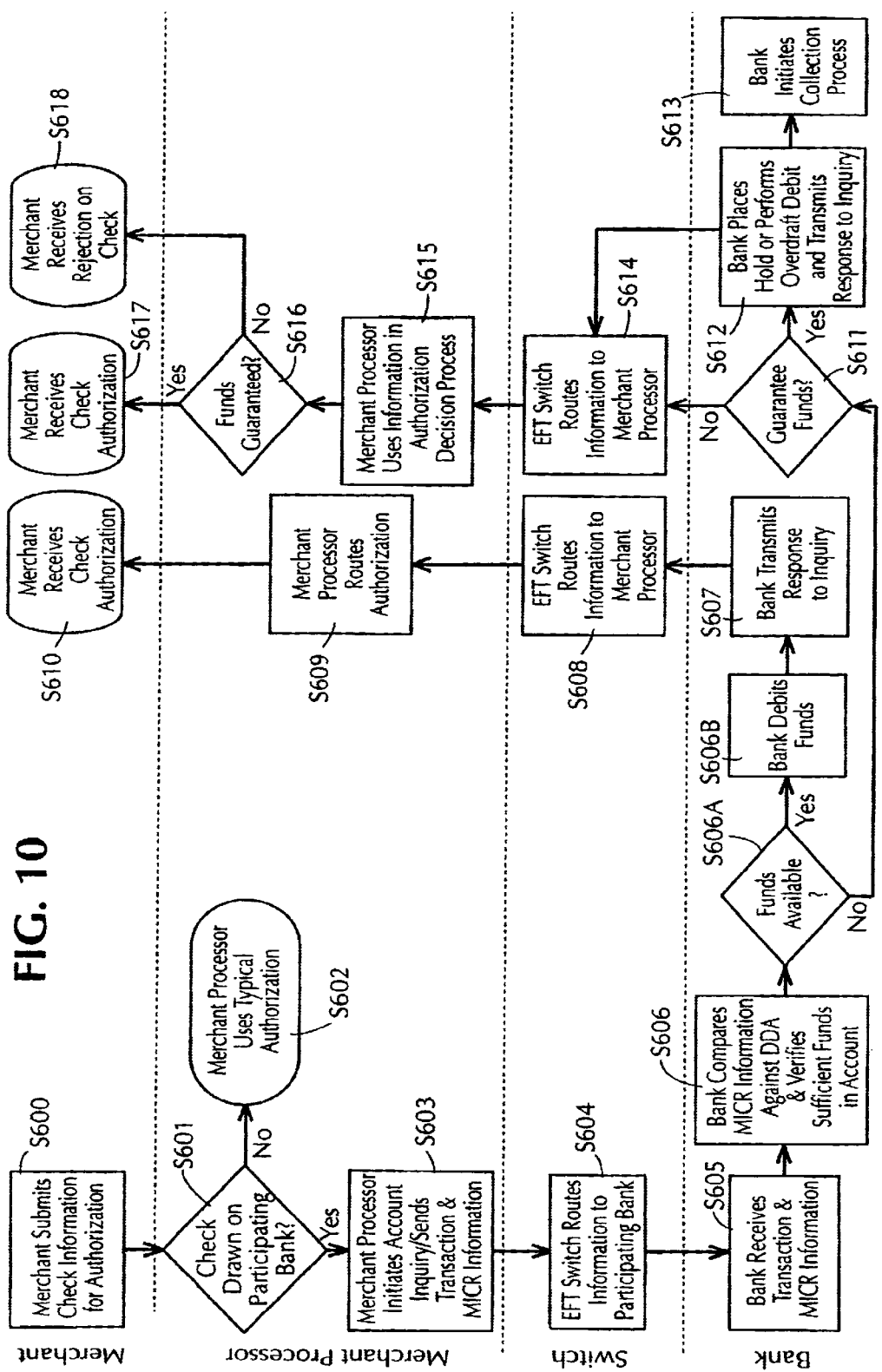
FIG. 10 is a flow chart illustrating a bank guarantee and bank debit process according to a sixth embodiment of the present invention.

In FIG. 10, steps S600 through S606 are identical to corresponding process steps in FIGS. 8 and 9 and will not be discussed further. At step S606A, if it is determined that the funds are available in the customer's DDA, the bank 112 debits the funds, at step S606B, and transmits a response to the inquiry, at step S607, to the EFT switch 110. At step S608, the EFT switch 110 routes the information from the bank 112 to the merchant processor 108, which, at step S609, routes the authorization to the merchant 104, who receives the authorization at step S610. On the other hand, if the funds are not available, it must be decided whether or not the bank 112 will guarantee the funds.

If the bank 112 decides to guarantee the funds, the process proceeds to step S612, at which time the bank 112 places a hold or performs overdraft debit and transmits the response to the inquiry to the EFT switch 110. If the bank 112 decides not to guarantee the funds, this decision is transmitted to the EFT switch 110 without performing steps S612 and S613. At step S614, the EFT switch 110 routes the information to the merchant processor 108. If it is determined, at step S616, that the bank 112 has guaranteed the funds, the merchant 104 receives authorization at step S617. On the other hand, if the bank 112 has not guaranteed the funds, the merchant 104 receives an indication of rejection of the check at step S618.

The difference between the embodiment shown in FIG. 9 and the embodiment shown in FIG. 10 is that the merchant processor 108 guarantees the transaction in FIG. 9, whereas in FIG. 10, the bank 112 guarantees the transaction.

In all of the embodiments described above, the check will flow to the payor bank for safekeeping or return to the customer. In some instances, the MICR data on the check will be captured by the BOFD and transmitted in advance of the physical check to the payor bank. In other cases, the physical check being delivered to the payor bank 112 will be the only form of presentment. However, in the embodiments in which the account is actually debited, the option exists to truncate the check. This could occur at the BOFD or at the merchant. If it occurs at the merchant, the check would preferably be returned to the customer. If truncation occurs at the BOFD, the check is preferably microfilmed and stored for safekeeping, should investigation be required as a result of a disputed transaction.

Certain of the embodiments of the present invention described above involve placing a hold on, or debiting funds from the customer's DDA. In implementing any of these embodiments, care must be taken that the customer's DDA not be debited twice, or his check wrongfully dishonored. This problem may occur because in traditional check presentment, when the physical check has made its way back to the payor bank, the DDA is debited in the amount of the check. However, in certain of the embodiments mentioned above, either a hold has been placed on the DDA, or the amount of the incoming check already has been debited. In the former case, the hold may result in the check being wrongfully dishonored upon presentment. In the latter case, if sufficient, that is extra, funds are present, the customer's DDA may be debited for twice the amount of the check. Even worse, if extra funds, such as double the amount of the check, are not present, a wrongful dishonoring of the check may occur, even though the account has already been debited for the amount of the check.

Figure 11:
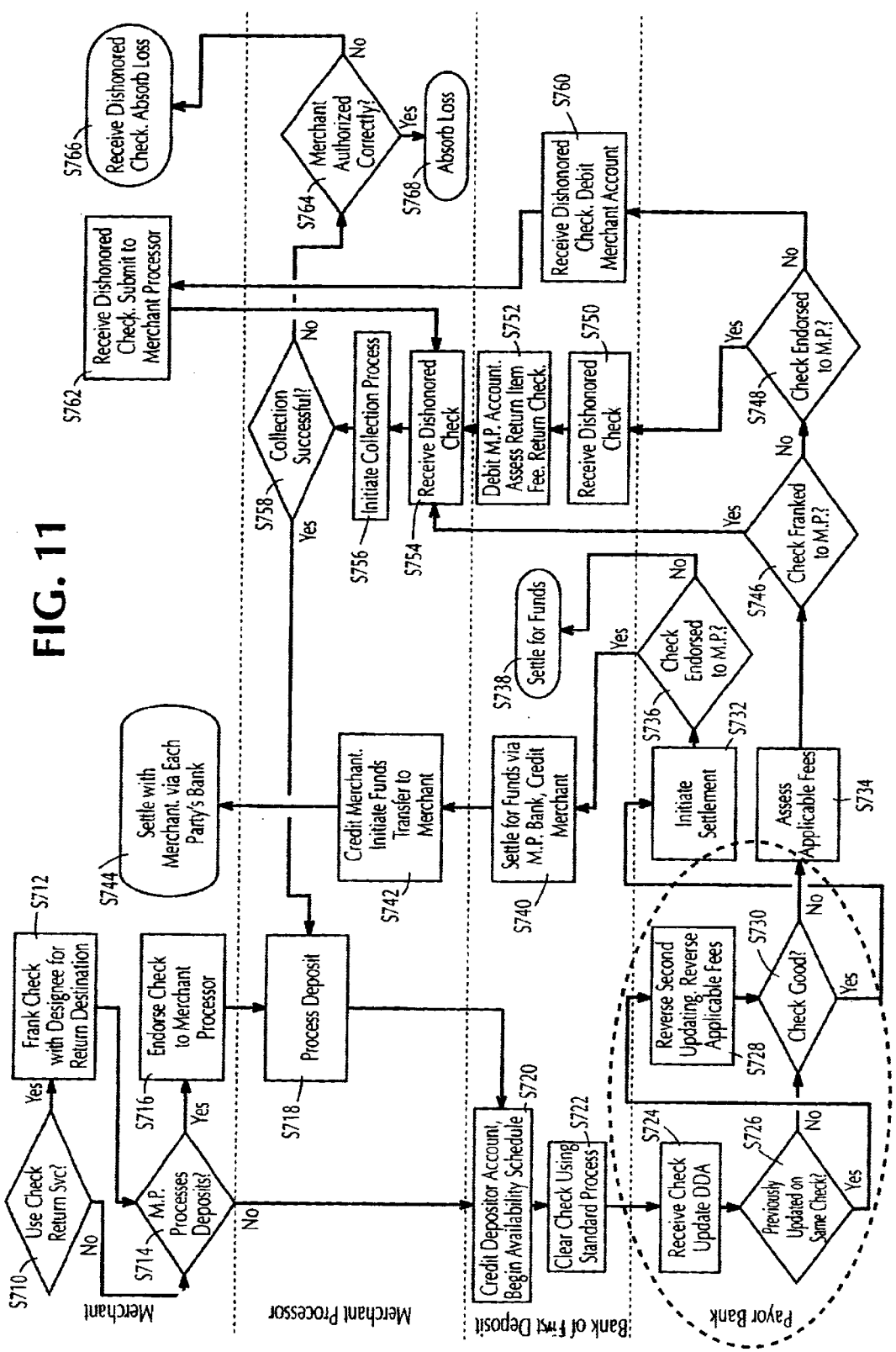
FIG. 11 is a flow chart illustrating the paper flow for the check authorization system of the present invention.

FIG. 11 shows a process for return and presentment of the physical check in accordance with the present invention. The process includes additional steps (shown in a dashed oval) to ensure that the problems discussed in the foregoing paragraph do not occur. FIG. 11 shows the process as the physical check migrates from the merchant to the payor bank for presentment. The flow proceeds among the merchant, the merchant processor, the bank of first deposit and the payor bank.

At step S710, if the merchant uses a check return service, the process flow proceeds to step S712 where the check is franked with the designee for return destination. Whether or not a check return service is used, it is next determined, at step S714, whether the merchant processor 108 processes deposits of the merchant's checks. If yes, the merchant endorses the check to the merchant processor 108 at step S716 and the merchant processor 108 processes the deposit at step S718, and the flow proceeds to step S720. If a "no" determination is made at step S714, the process flow proceeds directly to step S720. At step S720, the bank of first deposit credits the depositor's account, and begins the funds availability schedule set forth in "Regulation CC Availability of Funds and Collection of Checks" 12 C.F.R. § 229, from the Federal Reserve Board of Governors. Then, at step S722, the check is cleared using standard processes.

Steps S724, S726, S728 and S730, which occur at the payor bank, constitute a matching off process that is necessary to avoid the problems discussed above that are peculiar to the embodiments using DDA hold or debit at the time of the sale.

At step S724, the payor bank receives the check and updates the DDA. At step S726, if it is determined that the same check has been updated previously, for example by debiting or placing a hold at a POS transaction, at S728, the second updating is reversed, as well as any fees which have been charged twice, and the process proceeds to step S730. If the check has not been previously updated, the flow proceeds directly to step S730. At step S730, it is determined if the check is good.

If the check is determined to be good, the flow proceeds to step S732 to initiate settlement. If it has been determined at step S736 that the check has been endorsed to the merchant processor, at step S740, the bank of first deposit settles for funds via the merchant processor bank and credits the merchant. The merchant processor 108 then, at step S742, credits the merchant and initiates funds transfer to the merchant, and at step S744, settlement is made with the merchant. If the check has not been endorsed to the merchant processor, at step S738 the check is settled for funds at the bank of first deposit.

If, on the other hand, it is determined at step S730 that the check is not good, the payor bank assesses applicable fees, at step S734, and determines, at step S746 whether the check has been franked, i.e., marked with an indication to return, to the merchant processor. If yes, the flow proceeds to step S754 at which time the merchant processor receives the dishonored check, and initiates the collection process, at step S756. If collection is successful, the process proceeds back to step S718, presumably to the normal conclusion. If collection is unsuccessful, and it is determined at step S764 that the merchant authorized the check correctly, the merchant processor 108 absorbs the loss. If, however, the merchant did not authorize the check correctly, the merchant absorbs the loss.

If at step S746 it is determined that the check is not franked to the merchant processor 108, then it is determined, at step S748, whether the check is endorsed to the merchant processor 108. If it is so endorsed, the bank of first deposit receives the dishonored check in step S750, debits the merchant processor's account in step S752, and the process proceeds to step S754, with the merchant processor receiving the dishonored check.

If the check is not endorsed to the merchant processor 108, at step S760 the bank of first deposit receives the dishonored check and debits the merchant's account. The merchant then, at step S762, receives the dishonored check and may submit it to the merchant processor for reimbursement and subsequent collection by the merchant processor 108, if the check is guaranteed by the merchant processor. Once the bank places a hold or debits the account of the customer, the bank will become the guarantor, not the merchant processor.

Figure 11A:
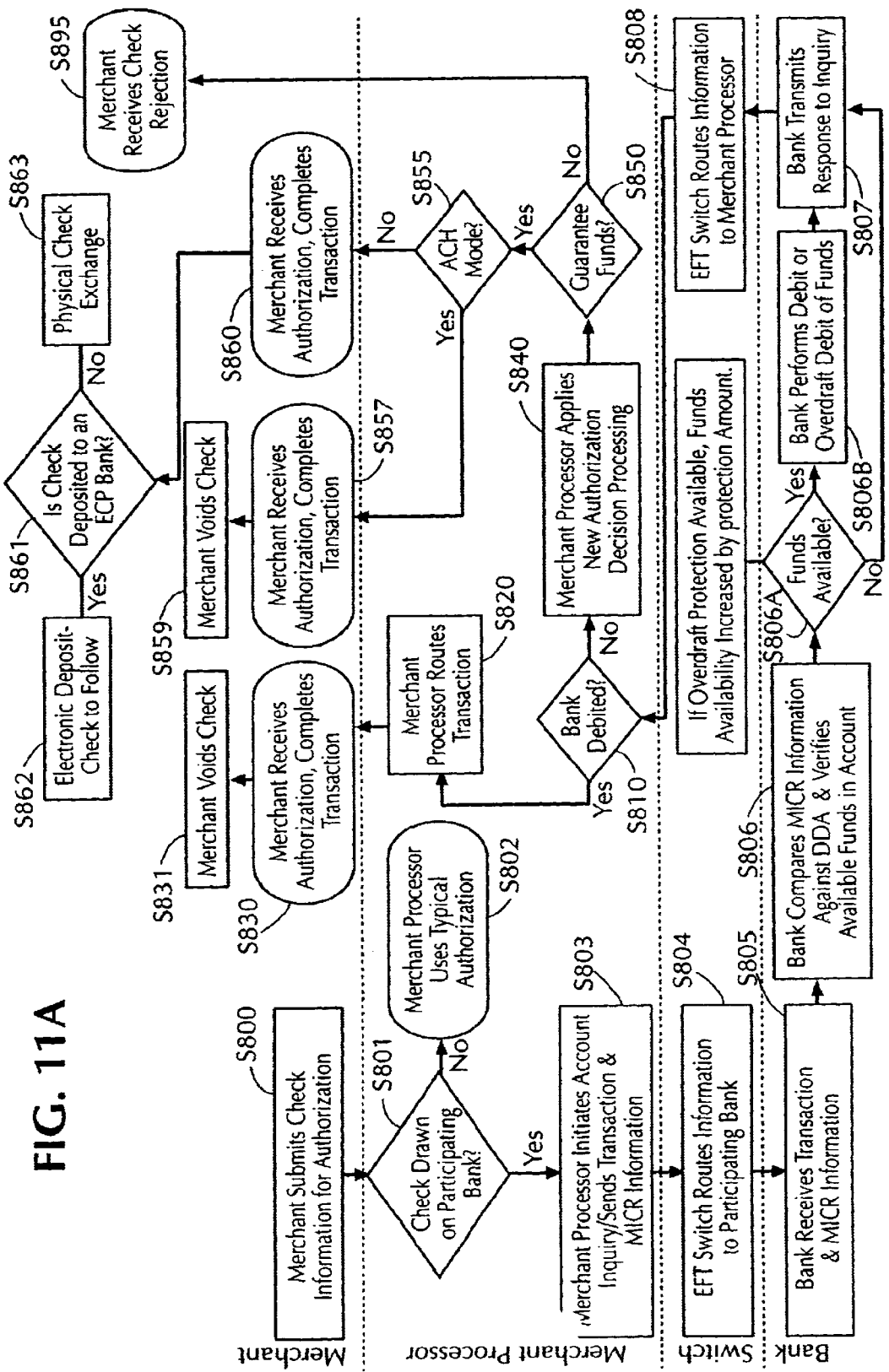
FIG. 11A is a flow chart illustrating a funds verification process according to a seventh embodiment of the present invention.

FIG. 11A illustrates a seventh embodiment of the present invention. In the seventh embodiment, the customer's check preferably is truncated at the point of sale and converted to an electronic item. As will be explained below, in this embodiment, after the electronic instrument has been paid by the payor bank, the paper check is stamped "void" and returned to the customer. The voiding of the check ensures that a particular check will only be used once.

To initiate payment in accordance with the seventh embodiment, the customer hands the check to the merchant in payment for goods or services. The merchant then swipes the check through the MICR reader to scan in the MICR data printed thereon. The scanned data is forwarded to the merchant processor at step S800, preferably together with transaction data, such as the check amount. The merchant processor, as discussed above, may be an entity separate from the merchant, such as a check guarantee service. However, the merchant processor may comprise instead additional functionality of the merchant, such as a dedicated computer of the merchant, or software running on the merchant's main computer.

Next, at step S801, the merchant processor determines, for example based upon the scanned MICR data, whether the check is drawn on a participating bank. If not, at step S802, the merchant processor uses typical check authorization and guarantee techniques, such as those discussed previously, to determine whether to authorize acceptance of the check.

If it is determined at step S801 that the check is drawn on a participating bank, for example by comparing the routing/transit numbers in the MICR information with a database of participating banks' routing/transit numbers, the process continues and electronic communication is initiated with the bank upon which the check is drawn.

Several options are available for connecting to the payor bank. A preferred method, connecting through an EFT switch, will be used in describing the present embodiment, for purposes of illustration.

The MICR and transaction information is forwarded in the form of an electronic message to the payor bank through the EFT switch. First, at step S803, the message, which includes an account inquiry, is forwarded to the EFT switch together with the transaction and MICR information. The EFT switch, at step S804, routes this information to the participating payor bank. The EFT switch communicates with the bank's front end computer, and the bank preferably is equipped with software that allows the message from the EFT switch to be processed, directly or indirectly, by the bank's DDA account computer.

At the payor bank, it is decided if the incoming information is a valid item that should be paid. Criteria for making such determination includes the existence of the account, whether sufficient funds are available in the account to cover the transaction, and whether or not any stop payment orders are currently in effect with regard to the account. Thus, at step S805 the bank receives the transaction and MICR information. At step S806, the bank compares the MICR information against DDA information and verifies whether the above criteria are satisfied. If it is determined at step S806A, taking into account overdraft protection, if available, that funds are available to cover the transaction and that the other criteria also are satisfied, the payor bank, at step S806B, performs a debit, or overdraft debit, of funds and at step S807 transmits a response to the inquiry to the EFT switch. If, on the other hand, criteria are not met, step S806B is skipped.

In any event, the response transmitted by the bank at step S807 is routed, at step S808, by the EFT switch to the merchant processor. If the merchant processor determines from the response that the bank account of the customer has been debited, the merchant processor, at step S820, routes the transaction and, at step S830, the merchant receives authorization and completes the transaction. At step S831, the merchant marks the customer's paper check "void" and returns it to the customer.

In the above embodiment, if the payor bank debits the funds, the funds would preferably be transferred to the merchant in a batch transaction, such as an automatic clearing house (ACH) transaction, at the end of the business day. The batch transaction would result in funds being deposited directly into the merchant's bank account.

If, on the other hand, the merchant processor determines that the customer's bank account was not debited, the flow proceeds to step S840 at which the merchant processor applies new authorization decision processing. For example, the merchant processor may determine, by consultation of good or bad check databases, that the customer has an excellent history with regard to writing checks. Results of such decision processing are used by the merchant processor to determine whether it will guarantee the funds. If, at step S850 the decision is made to guarantee the funds, the flow proceeds to step S855, at which it is determined whether an ACH mode is in effect. If so, the flow proceeds to step S857, at which the merchant receives authorization and completes the transaction. The flow proceeds to step S859, at which the merchant voids the check and returns it to the customer. If the ACH mode is not in effect, the flow proceeds to step S860, at which the merchant receives authorization and completes the transaction. In this case, since the ACH mode is not in effect, the merchant keeps the check and the transaction continues like an ordinary check-based transaction. If it is determined at step S861 that the check is to be deposited into a bank capable of performing electronic check presentment (ECP), then at step S862 ECP is initiated, with the paper check to follow to the payor bank. If the check is deposited into a non-ECP bank, at step S863, the check follows conventional paper check exchange processing for eventual presentment to and payment by the payor bank.

If, at step S850, the merchant processor has decided not to guarantee the funds, then, at step S895, the merchant receives the check rejection, and presumably would cancel the transaction.

Figure 11B:
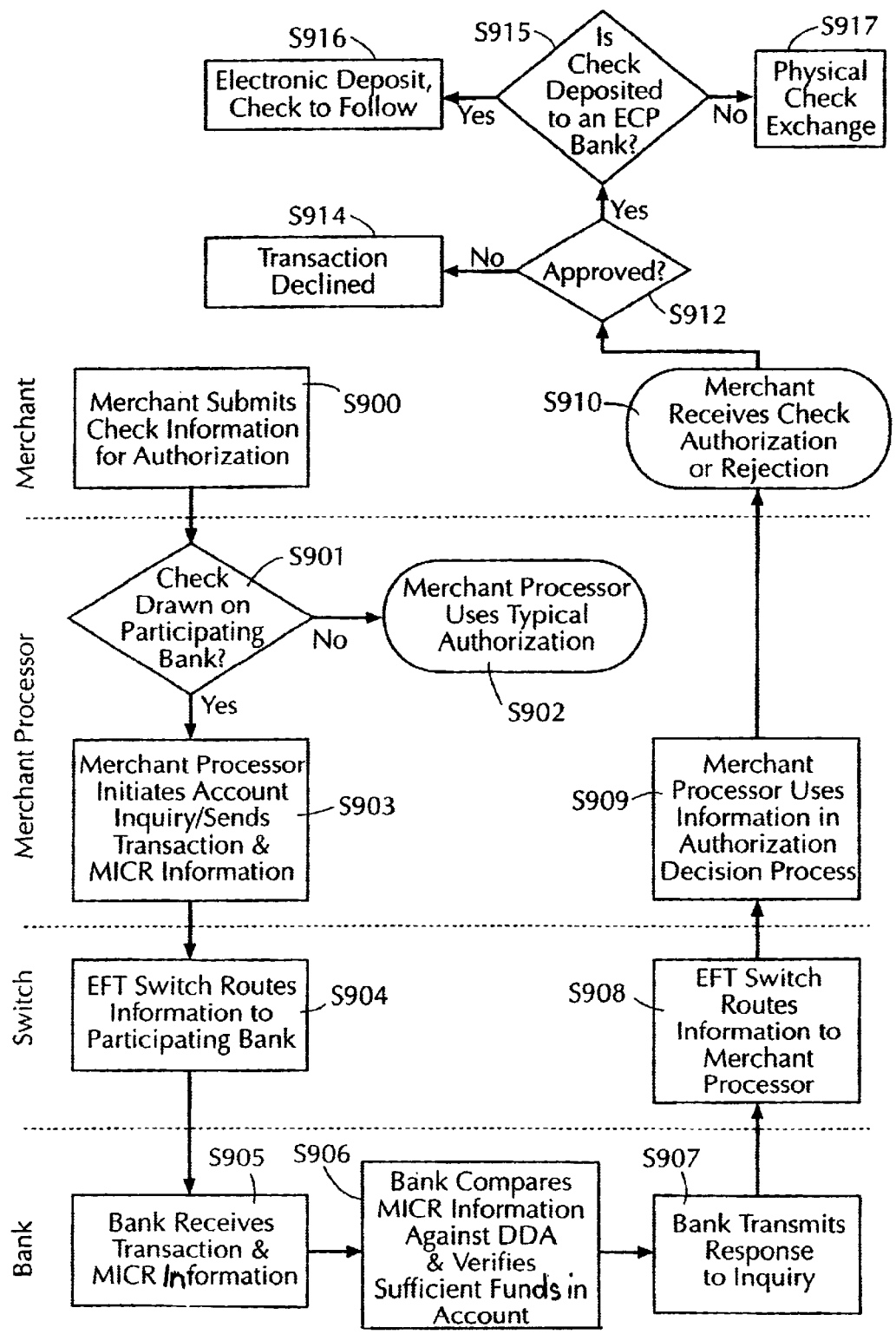
FIG. 11B is a flow chart illustrating a merchant/processor guarantee and bank debit process according to a eighth embodiment.

An eighth embodiment of the present invention is illustrated in FIG. 11B. As is shown in that figure, steps S900–S905 are identical to steps S800–S805 of the preceding figure. At step S906, the bank compares the MICR information against the DDA account information and verifies that sufficient funds are present in the customer's account to cover the transaction. At step S907 the bank transmits to the EFT switch a response to the inquiry. At step S908, the EFT routes the response to the merchant processor. The merchant processor, at step S909, uses the information contained in the response in its authorization decision process. The merchant receives the decision from the merchant processor at step S910. If, at step S912, the check has not been approved, the transaction is declined at step S914. If the check transaction has been approved, then at step S915 it is determined whether the check is to be deposited to an ECP bank. If so, then at step S916, electronic check presentment is begun, with the paper check to follow. If not, then at step S917, conventional check presentment is initiated, by means of a physical check exchange.

To implement the processes described in the flow charts detailed above will require banks to customize their front end software to accommodate those processes. In particular, in the present invention, a transaction sequence and protocol is utilized that takes advantage of existing standards, such as, in the preferred embodiment, the International Standards Organization (ISO) standard now utilized for ATM transactions, that is ISO Standard 8583. In the U.S., the American National Standards Institute (ANSI) is agent for the ISO.

Figure 11C:
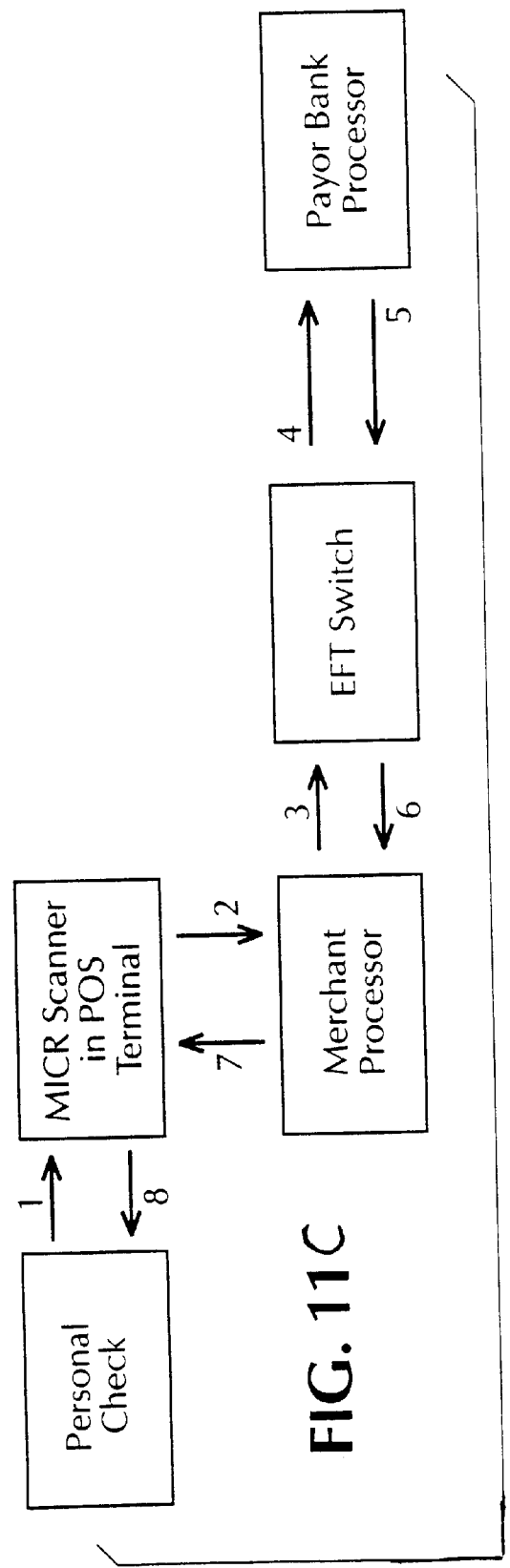
FIG. 11C is a flow chart illustrating the transaction flow for the check authorization system of the present invention.
Figure 12:
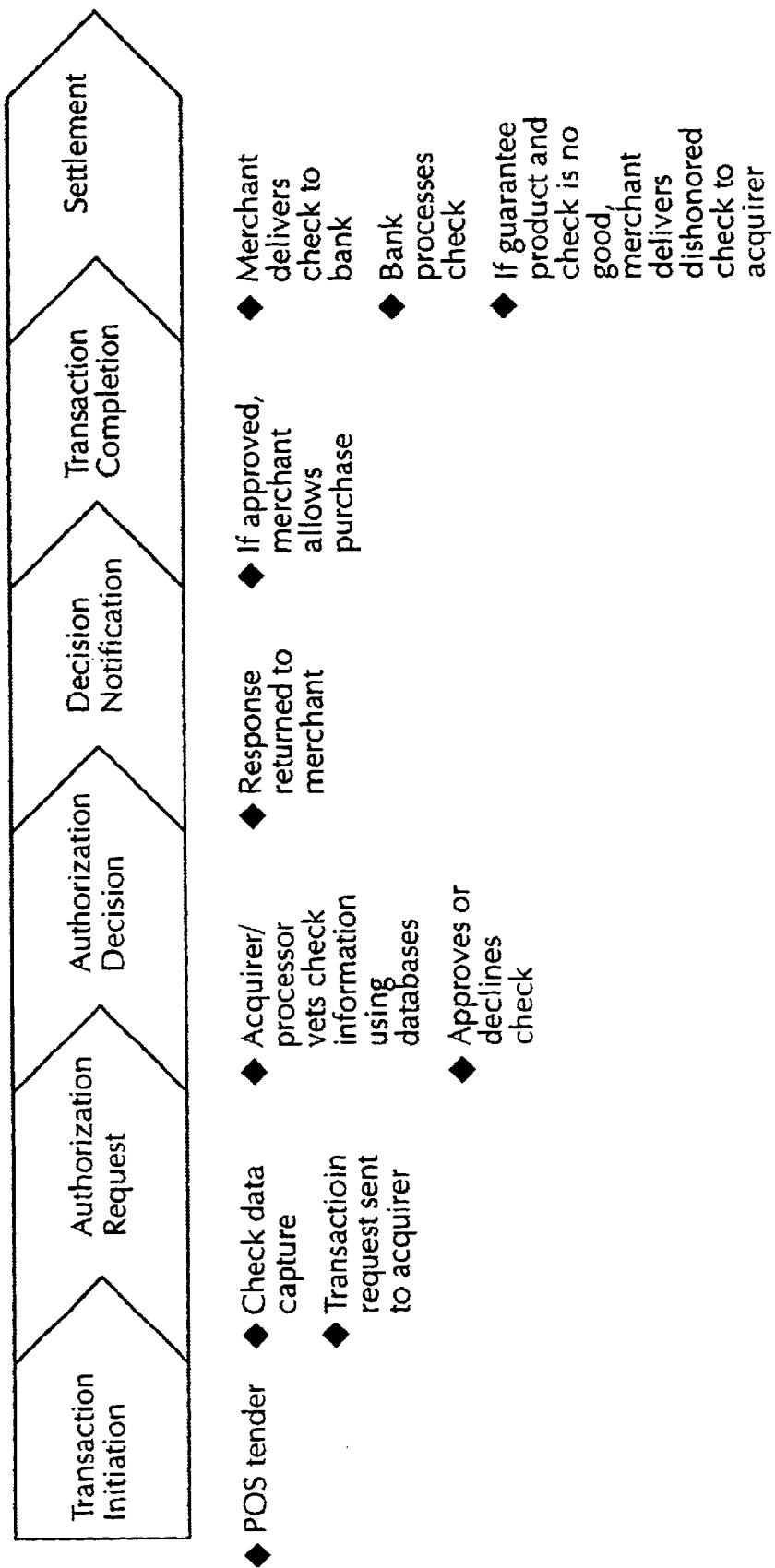
FIG. 12 is a chart showing the steps utilized by prior art check authorization services, which are described above.

The ISO, or ANSI, standard 8583, which is hereby incorporated by reference, sets forth the standard message protocol used for all electronic small value payments, such as ATM payments. The present invention preferably utilizes the message structure of ISO 8583 modified so as to carry the routing and transit number and DDA account number information in lieu of the data sent currently in PIN based transactions, such as ATM transactions. Preferably, in the present invention, the MICR data from the check is placed in a data element, or elements specifically designated for the MICR data, and the message does not include the data elements used for the PIN based transactions. In this manner, interrogation of the bit maps by the EFT switch 110 informs the switch to route the transaction by using the routing and transit number rather than by PAN, as the switch would do for card based transactions. Similarly, the bank front end software preferably would interrogate the bit map to determine that the incoming 8583 message is to be processed using the DDA account number, rather than the PAN, as would be used in a card based transaction. The format of the ISO 8583 message utilized by NYCE is detailed in The NYCE ISO Interface Specification, which is hereby incorporated by reference, especially at sections 6.1 and 7.5, and the ISO 8583 Certification Scripts, also incorporated by reference. A model of the transaction sequence to be implemented in the present invention is shown in FIG. 11C.

A typical transaction sequence in the system and method of the present invention begins at transaction 1 with a personal check being swiped through an MICR scanner (check scanner) 130 that forms part of the POS terminal 106. In transaction 2, the POS terminal 106 forwards a request message with a payment amount to the merchant processor 108. The merchant processor 108, in transaction 3, fabricates an ISO 8583 request message and forwards the message to the EFT switch 110. The ISO 8583 message is next routed by the EFT switch 110, in transaction 4, using the routing and transit number, which uniquely identifies the bank and account number of the check writer, to the payor bank 112, that is the bank upon which the check was written. The payor bank 112, in transaction 5, fabricates an ISO 8583 response message using the MICR information for account access and returns the ISO 8583 response message to the EFT switch 110. In transaction 6, the EFT switch 110 returns the ISO 8583 response message to the merchant processor 108 which, in transaction 7, returns the response message to the POS terminal 106. After having received the response message, the POS terminal 106 indicates the disposition of the request to the merchant.

Preferably, the bank 112's front end software will be an enhancement of one of the known front end software products used by banks in the U.S. to accept ISO 8583 transactions, such as ATM transactions. One example that may be utilized in the present invention is an enhancement of the known BASE24-atm (to be referred to as "BASE24" throughout the specification) software by Applied Communications, Inc. of Omaha, Nebr., a wholly-owned subsidiary of Transactions Systems Architects, Inc., a publicly traded corporation. The ACI Formal Product Documentation Suite for the BASE24-atm product is incorporated by reference, and documents the current state of the BASE24-atm software, prior to the enhancement.

BASE24 software is utilized by a large percentage of banks to accommodate transactions, and in particular ISO 8583 transactions, between the banks and EFT switches.

The enhancements to BASE24 required to accommodate the POS check verification of the present invention include adding a new check authorization transaction to the existing transaction set, routing of PAN (Primary Account Number) and PIN-less (Personal Identification Number) transactions to the check issuer by Routing and Transit Number, enhancements to the code for interfacing with the EFT switch 110, enhancements to the software for interfacing with the host computer 330 to facilitate online host verification, online access to the transactions for the purpose of customer service support, and reporting changes to reflect these new transactions and new transaction response codes for historical tracking of the result of the authorization.

In accordance with one aspect of the present invention, BASE24 is enhanced for the online only authorization level discussed below and becomes the fundamental infrastructure for support of the business requirement of the bank 112. In accordance with another aspect of the present invention, the enhanced BASE24supports Negative and Negative with Usage authorization discussed below with stand-in processing capabilities in case the bank 112's host computer 330 is unavailable. In accordance with yet another aspect of the present invention, the enhanced BASE24 software includes the capability to store balance information on the BASE24 system, off-loading the bank 112's host system from processing these transactions in an online environment.

The enhancement to BASE24 includes, among other things, the ability to allow for account verification and verification with hold transactions, to have BASE24 route a transaction without the ATM card data used in the current BASE24 software, and to recognize where in the MICR line to obtain the data that it needs. The current implementation of BASE24 routes transactions based on the card (e.g., ATM card) prefix number. The enhanced BASE24 instead routes based on the routing and transit number (RTTN). An RTTN is unique to an institution, although one institution may have multiple RTTNs (as a result of bank mergers, for example). Data within a MICR line is not standardized, except for the position and length of the RTTN. Additional data, such as the account number or the check number, may vary in position, even for the same RTTN.

In the preferred embodiment, the bank front end software that is utilized by the bank does not drive any terminals, nor act as a national or regional switch, but is a transaction processor, residing on bank 112's front end Tandem computer 300, and processes only transactions for the bank 112 at which it is installed. The front end software does not perform processing before a transaction reaches the front end software resident on the Tandem computer 300, or after it leaves the computer 300.

In the preferred embodiment, all check transactions will interact with bank 112's front end software via a single interface, such as EFT switch 110. The interface preferably will be an existing one, but modified to carry the check transactions in addition to the normal traffic. Preferably, one EFT switch will function as the single source EFT switch 110; however, any regional or national switch may be utilized, depending on the location of the bank 112. The EFT interface (I/F) is ISO-based. Therefore, considerable flexibility is available with regard to check transactions including the MICR and any additional check related fields. That is, by turning existing ISO 8583 bit positions on and off, and/or by redefining the meaning of certain bit positions, such as PAN, Track 2, and the PIN block, which would have no use with check transactions, this implementation should provide adequate capacity to carry all necessary check transaction data.

I. Authorization Levels

Once a transaction arrives, the front end software must allow check processing in the following authorization levels:
A. Online Only In this authorization level, the front end software always routes transactions to the host computer 330. There is no authorization or pre-authorization within front end software. A Host Interface module provides the connection.
B. Offline Only In this authorization level, the front end software is the only authorizer. It has the necessary database for making authorization decisions under one or more of the authorization methods described below.
C. Online/Offline In this authorization level, the front end software first tries to route to the host computer 330 for authorization using an ISO Host I/F module. If host computer 330 is not available, or the link to it is down, the front end software will stand in. The method used by the front end software may be different from that used by the host computer 330. For example, the front end software might use negative authorization, described below, even though the host computer 330 uses positive with balance.

II. Authorization Methods

When authorization takes place on the front end software, there are several methods available to perform the authorization. Enhanced front end software supports the following authorization methods in both the Online/Offline and Offline Only levels:
A. Positive With Balance For each transaction, the front end software verifies the existence and status of the account, looks for any duplicates or stops that exist for the specified check number or check number range, and confirms that the current available balance is sufficient to cover the transaction amount. For approved transactions, if the "hold" option is enabled, the front end software adds the transaction amount to the "amount on hold" while subtracting the same amount from the available balance.

If the available balance is not sufficient for the transaction amount, the front end software will deny the transaction for insufficient funds. Front end software performs the hold updates in both Offline Only and Online/Offline authorization levels, even if the Bank 112's host computer 330 provides the authorization. If the host computer 330 provides the approval, but the transaction exceeds the front end software available balance, the front end software will still allow the transaction to be approved. The front end software Positive Balance File (PBF) contains all account-specific data, and the Stop Pay File (SPF) holds all stopped check data.

B. Negative

For each transaction, the front end software looks up the account number in a negative file. The presence of a record for that account number results in a denial. The front end software Negative File (NEG) holds all negative file records. Front end software also looks for stops in the SPF. The presence of a stop results in a denial.

C. Negative With Usage

This authorization method is the same as the Negative method with one addition. Front end software keeps a total of the usage of each account for a specified usage period, typically one day. For each approved transaction, the front end software adds the transaction amount to the accumulated usage. If the transaction amount would cause the usage to exceed the account's usage limit for that period, the front end software denies the transaction. This is the only "limit" processing under this authorization method. At the end of each usage period, the front end software resets all usage totals to zero. In addition to the NEG and SPF files, the front end software Usage Accumulation File (UAF) holds the accumulated usage records.

III. Assumptions

In the preferred embodiment, the known front end software-atm, Release 5.1.2 with the full Self Service Banking modules, as enhanced, is the basis for the bank front end system.

Front end software is issuer only, that is, only resides in the bank 112's front end computer. Front end software will not generate any ISO request messages, except to pass them on to the bank 112's host computer system.

All check authorization requests for a particular bank come from a source such as the NYCE ISO Interchange as modified to carry out the check processing transactions. All such messages are PANless and PINless.

Front end software, as enhanced, will support the combinations listed below of authorization level and authorization method.

| Level | Method |
|---|---|
| Online Only | Not Applicable |
| Offline Only | Negative |
| Offline Only | Negative with Usage |
| Online/Offline | Negative |
| Online/Offline | Negative with Usage |
| Offline Only | Positive with Balance |
| Online/Offline | Positive with Balance |

All incoming messages from the merchant processor 108 through the EFT switch 110, and finally to the front end software resident at the bank 112's Tandem computer 300, will be of the following ISO 8583 message types, as was discussed above with reference to FIG. 11A, or their equivalent in a particular switch environment:

| 0100 | Authorization Request |
|---|---|
| 0200 | Authorization Request |
| 0420 | Reversal Advice |

All outgoing messages (from the front end software to the merchant processor 108) will be of the following ISO 8583 message types, or their equivalent in a particular switch environment:

| 0110 | Authorization Response |
|---|---|
| 0210 | Authorization Response |
| 0430 | Reversal Acknowledgment |

In accordance with one aspect of the present invention, three types of check transactions are allowed:

Account and balance verification

Account and balance verification with a hold

Account and balance verification with a debit

For each RTTN, there is only one combination of authorization level and authorization method. Data for the NEG, SPF, and PBF files may come in any of these three forms:

Refresh

Batch file of new data.

It may be a full-file (complete replacement) or a partial-file (file of adds, changes, and deletes).

The software module PATHWAY is provided in the enhanced front end software and supports the use of a screen to manually enter or alter data. This allows a user to perform reads, adds, changes, or deletes.

The module FHM From Host Maintenance allows an external host to send individual record changes in the form of an online message. FHM will then perform the reads, adds, changes, or deletes as specified. FHM applies to the NEG, SPF, and PBF files.

Front end software may internally generate force-post messages to the host if the front end software is providing stand-in authorization, and force-post messages are configured to be sent.

Front end software must carry POS information, such as merchant ID and SIC code.

Taking into account the above-identified assumptions, besides the normal installation, configuration, and connections of the current front end software system, the bank 112 must address the following impacts:

Refresh File Generation The bank 112 must provide input files for NEG, SPF, or PBF, depending on the authorization method selected. Unlike in the current front end software system, these Refreshes must include ALL accounts, not just those accessible by an ATM card.

Extract File Processing

The bank 112 must process the front end software output Transaction Log File (TLF) and Interchange Log File (ILF). New transactions on those files will be the new types of check authorization messages.

Host Online Connection

Host online processing will be enhanced to allow for the check authorization messages, and for FHM messages, if FHM is configured. When a host link is down, but comes back up, the front end software will also send force-post and advice transactions via the Store And Forward File (SAF).

The following paragraphs list highlights of the enhancements made in the front end software to implement the bank front end software of the present invention:

The enhanced front end software software adds New Check Authorization Transactions to allow the software to accept and process the new check transaction set. This includes specifying transactions allowed for each institution, carrying and logging check-related token data, and accessing the database during check transaction processing. This includes all screen changes associated with the database changes. Of special note, the enhancements allow the front end software to route check transactions differently than the corresponding ATM transactions. For example, ATM traffic may be processed offline on the front end software, while routing all check transactions to the host computer 330.

The enhanced front end software can delete the requirement that each message has a PAN, and usually a PIN. Instead, this information is replaced with a means to route by RTTN. Processing approximately equivalent to the way the front end software uses the Card Prefix File (CPF) also must be performed. This new processing links an RTTN to its corresponding profile, i.e., the structure of the MICR data, the owning institution ID, authorization level and method, routing, and other data to be defined. Note that there may be multiple MICR structures associated with a single RTTN. The enhanced front end software may have to first scan the MICR data before fully determining the MICR structure portion of the profile. Since the front end software is an Issuer, there may not be large numbers of RTTN records, and those that are present may be fairly stable. For that reason, this RTTN data will be entered via PATHWAY screens, and do not need a Refresh or FHM capacity for data entry.

The enhanced front end software will add the new transactions, fields, and altered bit maps to the EFT switch 110 interface code and support any additional tokens when dealing with the internal message and the ILF. The software will enforce the new message flow for check transactions and map from the front end software response codes to the EFT switch 110's response codes. Internal reversals will be generated if a response cannot be delivered to the EFT switch 110. External reversals will be accepted if sent by the EFT switch. The use of single or multiple stations through configuration will be supported and individual stations will be allowed to be designated for "check" transactions only, "normal" transactions only, or for both check and normal transactions.

The enhanced front end software software will add the new transactions, fields, and altered bit maps to the HISO I/F and support any additional tokens when dealing with the internal and external messages. The enhanced front end software will enforce the new message flow for check transactions and map from the bank host computer 330's response codes to the front end software's response codes. Reversals are generated if a response cannot be delivered to the front end software Authorization. The enhanced front end software software also allows for the SAF of check transactions when sending reversals or force-posts.

The enhanced front end software will have the ability to display certain new fields, such as check number, RTTN, the front end software response code, and certain token data and allows the perusal of transactions by RTTN, which is similar to searching by institution in the current front end software, or by account number, which is similar to searching by PAN in the current front end software.

The enhanced front end software supports the new transactions in a separate report and organizes reports into detail and monthly versions. Data is sorted by RTTN, with subtotals for each RTTN, and by account number.

The enhanced front end software software can send different response codes for different situations, including different "degrees" of certainty in an authorization. For example, assume a certain RTTN is configured for Online/Offline authorization. The bank 112's host computer 330 uses positive with balance while the front end software is set for negative authorization in stand-in mode. If a transaction is approved by the host computer 330, this should be reflected in a certain response code. If the same transaction was approved by the front end software in stand-in mode, this should be reflected in a different response code, yet still be an approval. Although both are approvals, the merchant processor 108 might want to take different action based on a stand-in approval than for a normal approval. For example, in a preferred embodiment, the stand-in approval might provide a check verification, while the normal approval might result in a full check guarantee.

Another level of merchant confidence can be added by adding additional customer information to the inquiry sent to the bank. Simply adding the customer's name to the inquiry allows the payor bank to make sure that the routing/transit number and account number correspond to the name of the customer as an authorized signer of checks on the account. The identity of the customer can be checked by the merchant, by a check of driver's license, or other photo identification.

Although the bank front end software has been described above with reference to a preferred embodiment, the present invention is not limited to the preferred embodiment. For example, the front end software other than the front end software may be used by the bank 112, as long as the software accommodates the transactions discussed above. Since most banks' front end software systems now support ISO 8583 message protocol, it is believed that the present invention can be effected making use of the great majority of commercially available software packages, each enhanced in the manner discussed above with respect to the front end software, to handle transactions using MICR data in lieu of PIN and PAN data currently used in ATM type transactions.

Although in the description of several of the embodiments, check presentment has been described as being effected by ECP, the invention is not limited to using ECP and may be utilized with traditional presentment techniques using the paper check.

The method and system of the present invention, as described above with reference to the preferred embodiments, advantageously permits a merchant to accept paper checks for payment with a higher degree of confidence than was provided in prior art systems. The system's ability to access DDAs of potential customers is particularly advantageous and allows for real-time verification, funds hold and funds debit of the customer's account by the merchant.

The present invention has been described in detail with particular reference to preferred embodiments thereof, but it will be understood that variations and modifications can be effected within the spirit and scope of the invention, that scope being defined by the appended claims.

What is claimed is:

1. A point-of-sale check transaction authorization method, comprising:

inputting into a point-of-sale terminal transaction information, including a transaction amount, and financial institution information from a check to be authorized;

communicating the input transaction information and financial institution information to a merchant processor having logic means for making a check authorization determination;

discriminating, from the financial institution information, whether or not the financial institution upon which the check was written is a participating financial institution;

if it is discriminated that the financial institution is not a participating financial institution, making a check transaction authorization determination based upon experiential databases accessible by the merchant processor;

if it is discriminated that the financial institution is a participating financial institution, performing the following steps:
 transmitting, by the merchant processor, an information request based upon the input transaction information and financial institution information to the financial institution upon which the check was written;
 verifying, by the financial institution upon which the check was written, whether an account associated with the financial institution information contains sufficient funds to cover the transaction, if sufficient funds are present and if other predetermined criteria are met, debiting, in real-time the account associated with the financial institution in the amount of the transaction, and transmitting information relating to the whether the account has been debited to the merchant processor;
 if the financial institution has performed the real-time debit of the account, the merchant processor communicating a transaction authorization to the merchant, and the merchant voiding the check and returning the check to the customer; and
 if the financial institution has not performed the real-time debit of the account, the merchant processor making a transaction authorization determination based upon information other than the account information transmitted from the financial institution,
 wherein for real-time debits said method utilizes a message format compatible with ATM transactions.

2. A method according to claim 1, wherein the financial institution transmits the information relating to whether the account has been real-time debited via an intermediary Electronic Funds Transfer (EFT) switch, which in turn forwards the information to the merchant processor.

3. A method according to claim 1, wherein the merchant processor transmits the information request via an intermediary Electronic Funds Transfer (EFT) switch, which in turn forwards the information request to the financial institution.

4. A method according to claim 1, wherein the sufficiency of funds in the account is determined taking into account overdraft protection.

5. A method according to claim 1, wherein the inputting step comprises scanning the check with a MICR scanner.

6. A method according to claim 1, wherein the merchant processor is located at the point of sale.

7. A method according to claim 1, wherein the merchant processor is located remotely from the point of sale.

8. A method according to claim 1, wherein, if the merchant processor makes a determination to authorize the transaction even in the event that the financial institution has not real-time debited the account, the merchant processor communicates a transaction authorization to the merchant, and wherein:
 if an ACH mode is in effect, the merchant voids the check and returns the check to the customer, and receives payment directly to his or her financial institution account via an ACH transaction; and
 if the ACH mode is not in effect, the merchant deposits the check for collection.

9. A method according to claim 8, wherein in the case that the ACH mode is not in effect, the check deposited by the merchant is presented for payment either by electronic check presentment, if the financial institution to which the check is deposited supports electronic check presentment, or by physical check exchange, if the financial institution to which the check is deposited does not support electronic check presentment.

10. A point-of-sale check transaction authorization system for authorizing a check that is presented to a merchant at the point of sale in payment for goods or services, the system comprising:
 an input unit operable to input information comprising: data from the check, including information as to a financial institution upon which the check was written, and transaction information, including an amount of the transaction; and
 a merchant processor operable to make an authorization decision, said merchant processor having:
  a communication unit operable to communicate with the financial institution;
  means for accessing information relating to a writer of the check from all experiential database; and
  logic means for making the authorization determination on the basis of:
   (a) the input information and information from the accessed experiential database, in a case that the data from the check is not indicative that the financial institution upon which the check was written is a participating financial institution; or
   (b) the information received in a communication with the financial institution, in a case that the data from check is indicative that the financial institution upon which the check was written is a participating financial institution;
 said merchant processor being operable, by means of the communication unit, to:
  transmit to the participating financial institution upon which the check was written an information request based upon the input financial institution data from the check and the input transaction information; and
  receive account information from the participating financial institution, the account information relating to whether the account has sufficient finds to cover the transaction amount and whether the account has been debited in real-time by the participating financial institution,
 the merchant processor further being operable to:
  if the financial institution has real-time debited the account: communicate a transaction authorization to the merchant, the merchant voiding the check and returning the check to the customer in response to the communication; and
  if the financial institution has not real-time debited the account, making a transaction authorization determination based upon information other than the account information transmitted from the financial institution,
 wherein for real-time debits said system utilizes a message format compatible with ATM transactions.

11. A system according to claim 10, further comprising a financial institution processor, located at the participating financial institution, the financial institution processor comprising:
 a financial institution communication units operable to communicate with the merchant processor; and
 account verification means for determining whether the account has sufficient fund to cover the transaction and, if the account is determined to have sufficient funds and the other predetermined criteria are met, debiting, in real-time the account in the amount of the transaction;
 said financial institution processor transmitting to the merchant processor the account information in response to receipt of the information request.

12. A system according to claim 11, further comprising an Electronic Funds Transfer (EFT) switch intermediate between the merchant processor and the financial institution processor, the EFT switch being operable to relay the information request from the merchant processor to the financial institution processor and to relay the account information from the financial institution processor to the merchant processor.

13. A system according to claim 10, wherein the merchant processor is located at the point of sale.

14. A system according to claim 10, wherein the merchant processor is located remotely from the point of sale.

15. A system according to claim 10, wherein if the merchant processor makes a determination to authorize the transaction even in the event that the financial institution has not real-time debited the account, the merchant processor communicates a transaction authorization to the merchant, wherein:
if an ACH mode is in effect, the merchant voids the check and returns the check to the customer; and
if the ACH mode is not in effect, the merchant deposits the check.

16. A system according to claim 15, wherein in the case that the ACH mode is not in effect, the check deposited by the merchant is presented for payment either by electronic check presentment, if the financial institution to which the check is deposited supports electronic check presentment, or by physical check exchange, if the financial institution to which the check is deposited does not support electronic check presentment.

17. A point-of-sale check transaction authorization apparatus for authorizing a check that is presented to a merchant at the point of sale in payment for goods or services, the apparatus comprising:

an input unit operable to input information comprising:
data front the check, including information as to a financial institution upon which the check was written, and transaction information, including an amount of the transaction;
a merchant processor operable to make an authorization decision, said merchant processor including:
a communication unit operable to communicate with the financial institution;
means for accessing information relating to a writer of the check from an experiential database; and
logic means for making the authorization determination on the basis of:
(a) the input information and information from the accessed experiential database, in a case that the data from the check is not indicative that the financial institution upon which the check was written is a participating financial institution; or
(b) on the basis of the information received in the communication with the participating financial institution, in a case that the data from check is indicative that the financial institution upon which the check was written is a participating financial institution;
said merchant processor being operable, by means of the communication unit, to:
transmit to the participating financial institution upon which the check was written an information request based upon the input financial institution data from the check and the input transaction information; and
receive account information from the participating financial institution, the account information relating to whether the account has sufficient funds to cover the transaction amount and whether the account has been debited in real-time by the participating financial institution,
the merchant processor further being operable to:
if the financial institution has real-time debited the account: communicate a transaction authorization to the merchant, the merchant voiding the check and returning the check to the customer in response to the communication; and
if the financial institution has not real-time debited the account, making a transaction authorization determination based upon information other than the account information transmitted from the financial institution,
wherein for real-time debits said apparatus utilizes a message format compatible with ATM transactions.

* * * * *

UNITED STATES PATENT AND TRADEMARK OFFICE
CERTIFICATE OF CORRECTION

PATENT NO.   : 6,647,376 B1
DATED        : November 11, 2003
INVENTOR(S)  : Henry C. Farrar et al.

It is certified that error appears in the above-identified patent and that said Letters Patent is hereby corrected as shown below:

Title page,
Item [57], ABSTRACT,
Line 7, discriminating," should read -- discriminates --.

Column 3,
Line 35, "that" should read -- than --.

Column 4,
Line 34, "the" should be deleted.

Column 5,
Line 45, "has-sufficient" should read -- has sufficient --.

Column 6,
Line 27, "a" should read -- an --.

Column 7,
Line 45, "and" should read -- a --.

Column 10,
Line 20, "are;" should read -- are --; and
Line 24, "If,ion" should read -- If, on --.

Column 12,
Line 56, "is extra," should read -- is extra --.

Column 17,
Line 35, "BASE24supports" should read -- BASE24 supports --; and
Line 48, "needs. The" should read -- needs. ¶ The --.

Column 20,
Line 41, "Generation  The" should read -- generation ¶ The --; and
Line 60, "software" (second occurrence) should be deleted.

Column 21,
Lines 36, 45 and 58, "software" (second occurrence) should be deleted.

UNITED STATES PATENT AND TRADEMARK OFFICE
CERTIFICATE OF CORRECTION

PATENT NO.    : 6,647,376 B1
DATED         : November 11, 2003
INVENTOR(S)   : Henry C. Farrar et al.

It is certified that error appears in the above-identified patent and that said Letters Patent is hereby corrected as shown below:

Column 23,
Line 16, "the" (first occurrence) should be deleted.

Column 24,
Line 36, "finds" should read -- funds --;
Line 57, "units" should read -- unit --; and
Line 61, "fund" should read -- funds --.

Column 25,
Line 36, "front" should red -- from --.

Signed and Sealed this

Thirteenth Day of July, 2004

JON W. DUDAS
*Acting Director of the United States Patent and Trademark Office*